US007577694B2

(12) United States Patent
Nakano et al.

(10) Patent No.: US 7,577,694 B2
(45) Date of Patent: Aug. 18, 2009

(54) DATABASE MANAGEMENT SYSTEM WITH REBALANCE ARCHITECTURES

(75) Inventors: Yukio Nakano, Oyama (JP); Nobuo Kawamura, Atsugi (JP)

(73) Assignee: Hitachi, Ltd., Tokyo (JP)

( * ) Notice: Subject to any disclaimer, the term of this patent is extended or adjusted under 35 U.S.C. 154(b) by 231 days.

(21) Appl. No.: 11/357,158

(22) Filed: Feb. 21, 2006

(65) Prior Publication Data

US 2006/0143248 A1    Jun. 29, 2006

Related U.S. Application Data

(62) Division of application No. 09/987,839, filed on Nov. 16, 2001, now abandoned.

(30) Foreign Application Priority Data

Jun. 27, 2001    (JP)    ............... 2001-194075

(51) Int. Cl.
   *G06F 17/30*    (2006.01)
(52) U.S. Cl. .................. 707/205; 707/1; 707/203
(58) Field of Classification Search ............... None
   See application file for complete search history.

(56) References Cited

U.S. PATENT DOCUMENTS

| | | | |
|---|---|---|---|
| 5,564,116 | A | 10/1996 | Arai et al. |
| 5,917,999 | A | 6/1999 | Yamamoto et al. |
| 6,067,545 | A | 5/2000 | Wolff |
| 6,145,067 | A | 11/2000 | Kuwata |
| 6,292,795 | B1 * | 9/2001 | Peters et al. .................. 707/3 |
| 6,330,653 | B1 | 12/2001 | Murray et al. |
| 6,405,284 | B1 * | 6/2002 | Bridge ........................ 711/114 |
| 6,487,634 | B1 * | 11/2002 | Bachmat ..................... 711/112 |
| 6,578,039 | B1 | 6/2003 | Kawamura |
| 6,813,623 | B2 * | 11/2004 | Wilding et al. .............. 707/200 |

FOREIGN PATENT DOCUMENTS

| | | |
|---|---|---|
| JP | 2-28877 | 1/1990 |
| JP | 2001-142751 | 5/2001 |

OTHER PUBLICATIONS

B. Bergsten et al., Overview of Parallel Architectures for Databases, The Computer Journal, vol. 36, No. 8, 1993, pp. 734-740.
D. J. DeWitt et al., Parallel Database Systems: The Future of Database Processing or Passing Fad?, Sigmond Record, vol. 19, No. 4, Dec. 1990, pp. 104-112.

* cited by examiner

*Primary Examiner*—Pierre M Vital
*Assistant Examiner*—Loan T Nguyen
(74) *Attorney, Agent, or Firm*—Brundidge & Stanger, P.C.

(57) ABSTRACT

A database system for storing table data as divided in a plurality of storages has a processing request acceptance section and an execution section which, at the time of rebalancing already stored data in response to addition of a storage, can execute inquiry operations concurrently. The system determines data to be moved from existing storages to the additional storage. When search, update and delete processing requests are issued during execution of the rebalance operation of copying the data to the additional storage and deleting the original data, both the DBMS acceptance section and DBMS executor section execute the operation corresponding to the requests. When an insert processing request is issued, the system determines a data insert destination on the basis of contents of a step of dividing the data from the existing storages to the additional storage.

4 Claims, 24 Drawing Sheets

FIG. 3

HASH FUNCTION VALUE STORAGE POSITION CORRESPONDENCE TABLE 317

| | AREA 0 | AREA 1 | AREA 2 | AREA 3 | AREA 4 | AREA 5 | AREA 6 | AREA 7 | AREA 8 | AREA 9 |
|---|---|---|---|---|---|---|---|---|---|---|
| ONE DIVISION | 0,9,4,6,7 1,8,5,2,3 | | | | | | | | | |
| TWO DIVISIONS | 0,9,4,6,7 | 1,8,5,2,3 | | | | | | | | |
| THREE DIVISIONS | 0,9,4,6 | 1,8,5 | 2,7,3 | | | | | | | |
| FOUR DIVISIONS | 0,9,4 | 1,8,5 | 2,7 | 3,6 | | | | | | |
| FIVE DIVISIONS | 0,9 | 1,8 | 2,7 | 3,6 | 4,5 | | | | | |
| SIX DIVISIONS | 0,9 | 1,8 | 2,7 | 3,6 | 4 | 5 | | | | |
| SEVEN DIVISIONS | 0,9 | 1,8 | 2,7 | 3 | 4 | 5 | 6 | | | |
| EIGHT DIVISIONS | 0,9 | 1,8 | 2 | 3 | 4 | 5 | 6 | 7 | | |
| NINE DIVISIONS | 0,9 | 1 | 2 | 3 | 4 | 5 | 6 | 7 | 8 | |
| TEN DIVISIONS | 0 | 1 | 2 | 3 | 4 | 5 | 6 | 7 | 8 | 9 |

STOCK TABLE

| PRODUCT CODE | PRODUCT NAME | COLOR | UNIT PRICE | STOCK AMOUNT |
|---|---|---|---|---|
| 101 | BLOUSE | BLUE | 3500 | 62 |
| 102 | BLOUSE | WHITE | 3500 | 85 |
| 200 | POLO SHIRT | BLACK | 3640 | 29 |
| 204 | POLO SHIRT | GREEN | 3640 | 63 |
| 302 | SKIRT | WHITE | 5110 | 65 |
| 353 | SKIRT | RED | 4760 | 18 |
| 354 | SKIRT | GREEN | 4760 | 56 |
| 410 | SWEATER | BLUE | 8400 | 12 |
| 416 | SWEATER | WHITE | 8400 | 22 |
| 591 | SOCKS | BLUE | 250 | 300 |
| 592 | SOCKS | WHITE | 250 | 90 |
| 593 | SOCKS | RED | 250 | 280 |
| 677 | SWEAT SHIRT | BLUE | 4500 | 45 |
| 678 | SWEAT SHIRT | WHITE | 4500 | 76 |

DATABASE MANAGEMENT SYSTEM WITH REBALANCE ARCHITECTURES

This application is a Divisional Application of U.S. patent application Ser. No. 09/987,839, filed Nov. 16, 2001 now abandoned.

CROSS-REFERENCES TO RELATED APPLICATION

This application relates to copending patent application Ser. No. 09/702,351 entitled "DATABASE MANAGEMENT METHODS AND EQUIPMENT, AND DATABASE MANAGEMENT PROGRAM STORAGE MEDIA" filed by Nobuo Kawamura on Oct. 31, 2000.

BACKGROUND OF THE INVENTION

The present invention relates to a database for data management based on table, and more particularly to a database system suitable to rebalance data among shared database files at the time of changing the number of storages for storing therein table data as divided.

B. Bergsten et al., "Overview of Parallel Architectures for Databases", THE COMPUTER JOURNAL, Vol. 36, No, 8, 1993, pp. 734-740 teaches an architecture wherein the processing load of a relational database management system (RDBMS) is distributed into a plurality of processors for parallel execution. D. J. DeWitt et al., Parallel Database Systems: The future of Database Processing or a Passing Fad?, SIGMOND RECORD, Vol. 19, No. 4, December 1990, pp. 104-112 discloses a database system wherein table data are stored as divided in a plurality of disks (storages) for distribution of disk access in RDBMS.

One of such conventional table division systems is a hash division system in which a hash function is used for values of columns which make up a table for uniform division. In this system, since table data are uniformly stored in respective disks (storages), a load can be uniformly distributed thereinto.

However, as the amount of data increases, this will involve lack of capacities of the storages or performance deterioration. To avoid this, it becomes necessary to increase the number of disks for storage of table data by increasing the number of divisions.

U.S. Pat. Nos. 6,145,067; 5,917,999 and 5,564,116 disclose disk array systems wherein, when a storage is added, data rebalance among shared database files has to be carried out concurrently with data access (read, write). In the data rebalance technique of these disk array systems, however, it is necessary to share information on, e.g., position during data rebalance. In other words, in order that a node for accepting an access request obtains information during data rebalance, it is required to perform data transfer between associated nodes for data rebalance and then to inform its information to the node for acceptance of the access request, thus resulting in generation of a communication overhead.

Accordingly, even when the data rebalance technique in the aforementioned disk array systems is applied to a database system, it is difficult to effectively execute the data rebalance processing and data access parallelly or concurrently. That is, it is required in the database that the data rebalance and data access be executed concurrently while eliminating the need for sharing information such as a position during the data rebalance.

The problem in the prior art is that database processing such as search, update, delete or insert to a table cannot be executed during data rebalance execution caused by changing the number of storages for storing tables.

SUMMARY OF THE INVENTION

It is therefore an object of the present invention to provide a database system, database management method and program, which, even during data rebalance execution of table data, can perform acceptance and execution of a database processing request such as search, update, delete or insert concurrently with the rebalance execution and with improved operability and performance of a database.

In accordance with an aspect of the present invention, the above object is attained by providing a database management system which includes a storage having a first storage area corresponding to a plurality of storages for saving a plurality of data items and a second storage area corresponding to a storage to be added to or disconnected from the plurality of storages, an acceptance section connected to the storage for accepting a data processing request, the data processing request including data processing in the plurality of storages and data rebalance between the storages, and a plurality of executors connected to the acceptance section for sequentially executing at least any of the data processing in the plurality of storages and the data rebalance.

The storage may have a storage area correspondence table indicative of combinations of predetermined data items to be shared by the plurality of storages and to be sharedly stored thereby according to the request of addition or disconnection to cause the data rebalance between the storages.

The acceptance section has a during-rebalance flag indicating that 'during rebalance' of the plurality of storages by addition or disconnection to or from the plurality of storages. According to a data processing request to the data items stored in the plurality of storages, the acceptance section can refer to the during-rebalance flag and reflect data update even on the storages subjected to the data rebalance.

The system in accordance with the invention of the present application may include means, in response to a rebalance request of data to be rebalanced in a storage added according to an addition request, for adding data position information to data before subjected to the rebalance execution by the data rebalance request in the plurality of storages, and means for deleting the data added with the data position information before subjected to the rebalance execution in response to the rebalance request after the rebalance execution by the rebalance request.

In accordance with another aspect of the present invention, there is provided a database management method which can be realized in the above system. The method includes steps of allocating a plurality of data items in a table to a plurality of storages for their storage; storing the table data in the storages determined according to a specified division rule (method); when a request is issued to add a storage for storage of the table data, determining part of the data stored in the existing storages which is to be moved to the addition storage with use of information about the existing and additional storages according to the specified division method and performing data rebalance operation to move all the determined data to the additional storage; when a request for search, update delete to the table is issued during the data rebalance execution, searching for, updating or deleting the table data stored in the existing storages and in the additional storage; and when a request of insert in the table is issued, inserting the data determined by the specified data division method in the storages together with information about existing and additional storages. In accordance with a further aspect of the present invention, there is provided a parallel database method which includes steps of allocating a plurality of data items in a table as table data to a plurality of storages for their storage and storing the table data in storages determined by a specified division method; when a request is issued to search, update or delete the table is issued, performing parallel operation over the respective storages; when a request is issued to add a storage for storage of the table data, determining part of the data stored in existing storage parts which is to be moved to the additional storage according to a specified division method with use of information about the existing and additional storages; performing data rebalance operation to move all the determined data to the additional storage; when a request is issued to search, update or delete the table during the data rebalance operation, performing parallel operation in the existing storages over the table data stored therein to search for, update or delete the table data; after completing all the operations of the existing storages, performing parallel operation over the respective storages to search, update or delete the table in the additional storage; and when a request is issued to insert data in the table, inserting the data determined by the specified data division method in the existing and additional storages together with information about the existing and additional storages.

In accordance with a further aspect of the present invention, there is provided a database method which includes steps of allocating a plurality of data items in a table as the table data to a plurality of storages for their storage; storing the table data in the storages determined by a specified division method; when a request is issued to add a storage for storage of the table data therein, determining part of the data stored in existing storages which is to be moved to the additional storage according to the specified division method with use of information about the existing and additional storages, copying the determined data from the existing storages to the additional storage, and adding position information of the copied data on the additional storage to the data of the storages as a copy source; when, the copy of all the data to be moved o the additional storage is completed, performing data rebalance operation to delete all the data of the copy source; when a request is issued to search the table during the data rebalance execution, searching the existing storages for associated data stored therein; when a request is issued to update or delete the table, updating or deleting associated data stored in the existing storages; when position information indicative of a copy target to the additional storage is added to the data to be updated or deleted, updating or deleting even data of the copy target; when a request is issued to insert data in the table, storing the data in the existing storages determined by the specified division method; when the data to be added is judged as to be moved by the specified division method even to the additional storage, storing the data even in the additional storage as a move target; and adding storage position information to the additional storage to the data stored in the existing storages.

The aforementioned systems and methods can be selected and executed depending on the defined table.

BRIEF DESCRIPTION OF THE DRAWINGS

FIG. 3 is exemplary registration contents of a table showing hash function value storage position correlation;

FIG. 6 shows an example of a stock table to be managed by the database management system of FIG. 5;

DESCRIPTION OF THE EMBODIMENTS

Embodiments of the present invention will be detailed by referring to the accompanying drawings.

Figure 1:
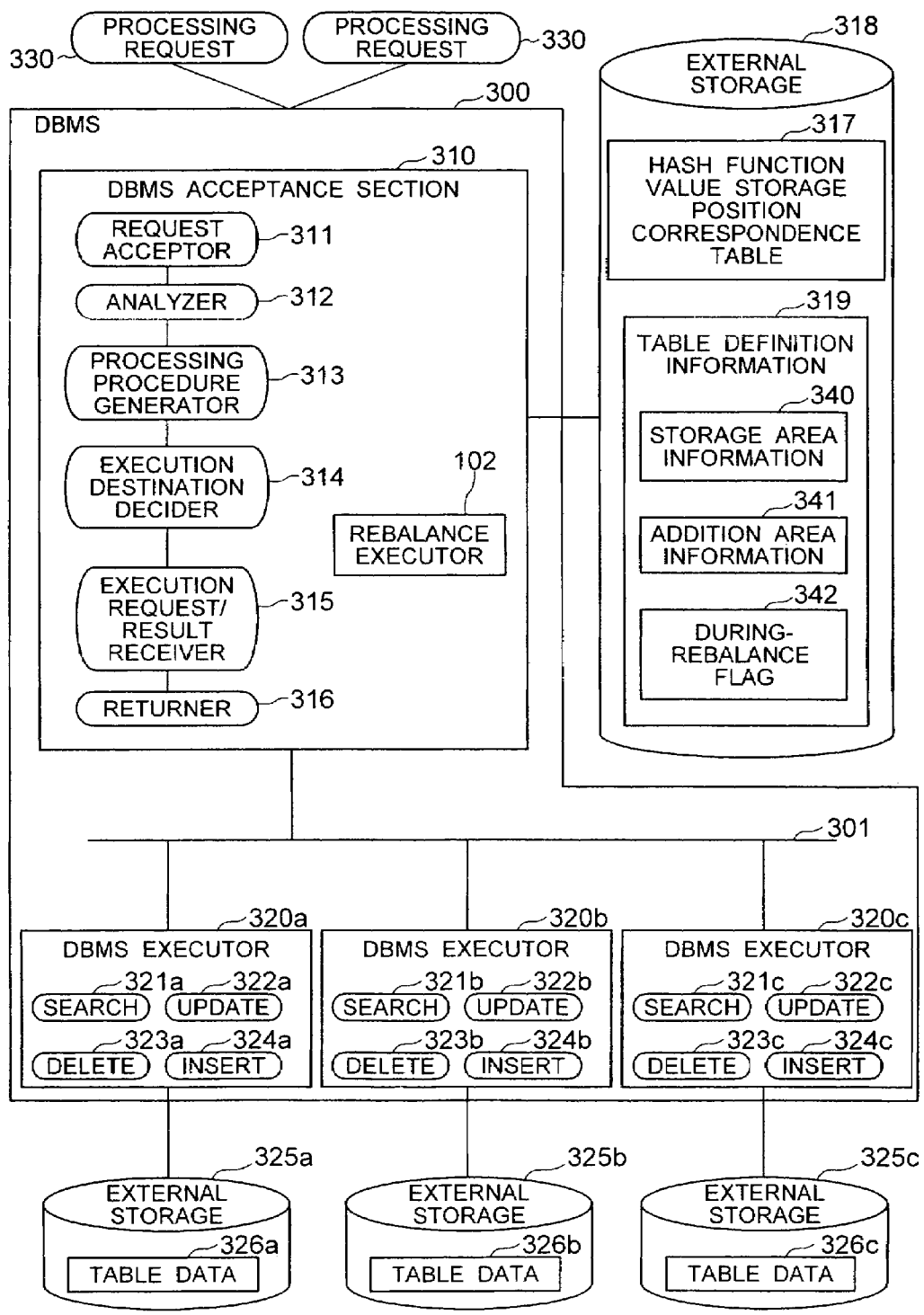
FIG. 1 is a block diagram of an exemplary arrangement of a database system in accordance with the present invention.
Figure 2:
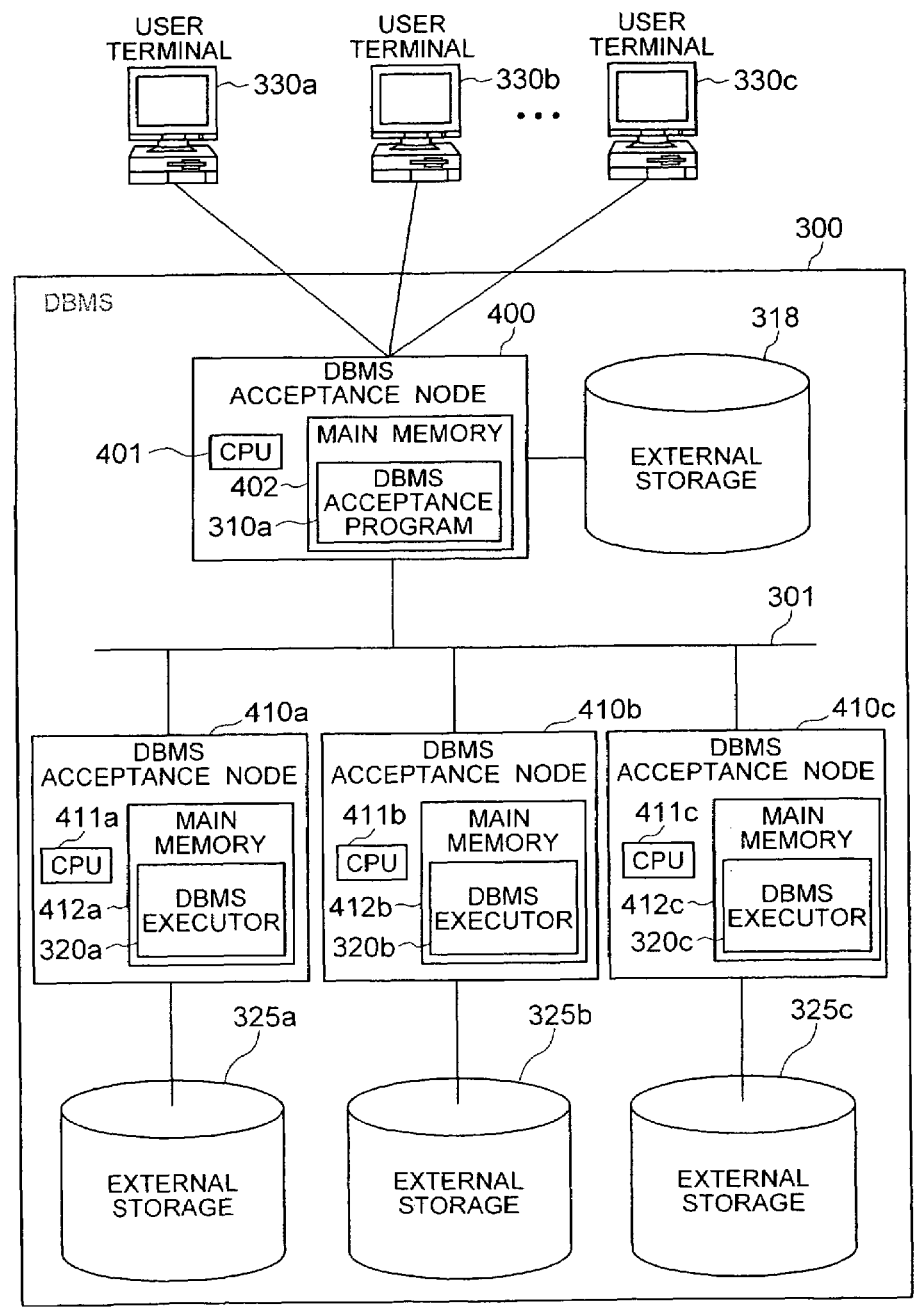
FIG. 2 is a block diagram of an exemplary structure of a hardware section in the database system of FIG. 1.

FIG. 1 is a block diagram of an exemplary arrangement of a database system in accordance with an embodiment of the present invention, FIG. 2 is a block diagram of an example of a hardware section in the database system of FIG. 1, FIG. 3 shows exemplary registration contents of a table of hash function value storage position correspondence in FIG. 1, and FIG. 4 shows diagrams for explaining a first example of accepting and executing a database processing request in rebalance operation of a database management system in FIG. 1.

As shown in FIG. 2, a database management system (which is also shown by DBMS in the drawings) 300 forming one section of the database system of the present invention, which includes a central processing unit (CPU), an input device, a display unit and so on, functions to perform database processing such as data search, update, delete, or insert (add) on the basis of a request from a plurality of user terminals 330a to 330c each having a computer function. The database management system 300 includes a DBMS acceptance node 400 and DBMS execution nodes 410a to 410c, which have each a computer function and are interconnected by a network 301.

The DBMS acceptance node 400 has a CPU 401 and a main memory 402 and also is connected to an external storage 318 in the form of a hard disk drive (HDD) or the like. When the CPU 401 executes a DBMS acceptance program 310a stored in the main memory 402, the DBMS acceptance section 310 in FIG. 1 can perform respective functions in the DBMS acceptance operation.

The DBMS execution nodes 410a to 410c have CPU's 411a to CPU 411c and main memories 412a to 412c respectively, and are also connected to external storages 325a to 325c respectively. When the CPU's 411a to CPU 411c execute respective DBMS execution programs (which is shown by DBMS execution PGM's in the drawings) 320a to 320c stored in the main memories 412a to 412c, the DBMS execution programs 320a to 320c in FIG. 1 can perform respective functions for the DBMS execution.

The DBMS acceptance program 310a and DBMS execution programs 320a to 320c are usually stored in a recording medium including an optical disc such as CD-ROM (compact disc-read only memory) or DVD (digital video disc/digital versatile disc). These programs are installed from these recording medium to the external storage 318 and external storages 325a to 325c to be loaded into the main memory 402 and main memories 412a to 412c.

A DBMS acceptance section 310 and the DBMS execution programs 320a to 320c in the DBMS 300 shown in FIG. 1, which correspond to the DBMS acceptance node 400 and DBMS execution nodes 410a to 410c shown in FIG. 2, are interconnected by the network 301.

The DBMS acceptance section 310 has a request acceptor 311, an analyzer 312, a processing procedure generator 313, an execution destination decider 314, an execution request/result receiver 315, a returner 316, and a rebalance executor 102. The DBMS executors 320a to 320c have searches 321a to 321c, updates 322a to 322c, deletes 323a to 323c, and inserts 324a to 324c respectively.

The DBMS acceptance section 310 accepts from user terminals a processing request 330 such as data processing and rebalance operation via the request acceptor 311, analyzes the request in the analyzer 312 therein, and generates a processing procedure to realize the request in the processing procedure generator 313.

Then the execution destination decider 314 determines which one of the DBMS executors should execute the generated processing procedure on the basis of data division conditions, the execution request/result receiver 315 issues an execution request to the determined DBMS executor and receives its execution result from the DBMS executor. The received result is returned from the returner 316 to the user.

The analyzer 312, processing procedure generator 313 and execution destination decider 314 refer to a hash function value storage position correspondence table 317 or table definition information 319 stored in the external storage 318, and acquire information for determination of a data storage destination or information about the table.

Stored in the table definition information 319 are, for example, storage area information 340 for management of storages having the table stored as divided therein, addition area information 341 for management of a storage for storage area addition, and a during-rebalance flag 342 indicative of 'during rebalance operation'. Details of respective constituent elements of the table definition information 319 will be explained later in connection with a specific example with reference to FIGS. 5 to 12.

The DBMS executors 320a to 320c, in response to an instruction of search, update, delete or insert received from the DBMS acceptance section 310, activate the searches 321a to 321c, updates 322a to 322c, deletes 323a to 323c or inserts 324a to 324c, execute its processing procedure, and return the execution result to the DBMS acceptance section 310.

During the execution of the processing procedure, the DBMS executors 320a to 320c access table data 326 stored in the external storages 325a to 325c.

In such processing, when the execution destination decider 314 of the DBMS acceptance section 310 selects a plurality of executors (320a to 320c), the execution request/result receiver 315 of the DBMS acceptance section 310 may issue an execution request to all the selected DBMS executors (320a to 320c) simultaneously to execute parallel processing in the respective DBMS executors (320a to 320c).

Explanation will now be made as to the data dividing operation in the DBMS 300. In this example, when data are stored as divided, a hash function is applied to the data to be stored to generate values of from 0 to 9, and the data are distributed to respective storage destinations according to the generated values.

The table 317 showing its details in FIG. 3 is used to determine a storage position based on the hash function value. In this example, data is divided into up to 10 parts according to the number of external storages connected. The table also shows information about storage areas where data is stored at the time of the division by the hash function values.

For example, when data is stored as divided into two storages, as shown items of "area 0" and "area 1" at the time of two divisions in the hash function value storage position correspondence table 317, data about hash function values of 0, 4, 6, 7 and 9 are stored in the "area 0", and data about hash function values of 1, 2, 3, 5 and 8 are stored in the "area 1".

When a storage area was added, even data to be moved by the rebalance executor 102 can be found from the hash function value storage position correspondence table 317. When a single storage is added and two divisions are changed to three divisions, for example, "area 2" is added and data of hash function values of 2, 7 and 3 are stored in "area 2", as in the case of three divisions in the hash function value storage position correspondence table 317. Thus it is only required to move the data of the hash function values of 2, 7 and 3 so far stored in "area 0" and "area 1" to "area 2" as an addition area.

Similarly, in the case of changing from two divisions to five divisions, "area 2", "area 3" and "area 4" are added, data of hash function values of 2 and 7; 3 and 6; and 4 and 5 are moved to "area 2", "area 3" and "area 4" respectively.

For data moving operation when such a storage area was added, that is, for rebalance and acceptance of a request of database processing (such as search, update, delete, or insert); the database management system 300 in the database system having such an arrangement as shown in FIG. 1 copes with it in such a manner as to be explained below.

More specifically, when it is required to add a storage for table data such as an external storage 325c external storage, the rebalance executor 102 in the DBMS acceptance section 310 refers to the hash function value storage position correspondence table 317, determines data to be moved from existing storages such as the external storages 325a and 325b to an additional storage (external storage 325c), and moves all the data determined as to be moved to the additional storage (external storage 325c).

When such processing as to search for, update or delete data in the table is required during execution of the data rebalance operation; the database management system executes the search, update or delete operation for the existing storages (external storages 325a and 325b) and the additional storage (external storage 325c) respectively. When it is required to insert data in the table, the database management system refers to the hash function value storage position correspondence table 317, and inserts the data in the associated storage (any of the external storages 325a to 325c).

Assume that the database management system 300 in FIG. 1 is of a parallel database type which performs parallel processing operation over storages when it is required to search for, update and delete table data. If it is required to search for, update and delete the table data during execution of data rebalance operation, then the system performs parallel processing operation over existing storages (external storages 325a and 325b) to search fir, update and delete the table data stored therein. After fully completing the processing of the existing storages, the system sequentially performs the search, update and delete operations over the additional storage and external storage 325c. Further, when it is required to insert data in the table data, the system refers to the hash function value storage position correspondence table 317 including information on the existing storages (external storages 325a and 325b) and information on the additional storage (external storage 325c), and inserts the data in one of the storages (external storages 325a, 325b and 325c) determined by the execution destination decider 314.

Explanation will be made in more detail by referring to FIG. 4 as to how to control the data moving operation by the database management system 300 in FIG. 1 in accordance with the present invention when a storage area is added, that is, as to operation of accepting and executing a database processing request during rebalance operation.

Figure 4A:
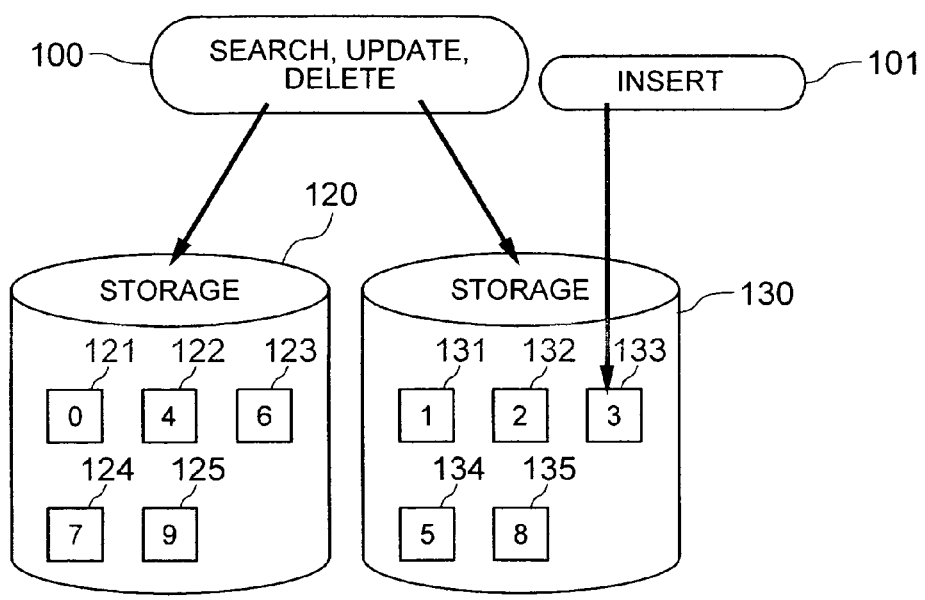
FIGS. 4A and 4B are diagrams for explaining a first example of accepting and executing a database processing request during rebalance operation of a database management system in FIG. 1.

Explanation will be made as to the rebalance operation as well as the search, update, delete and insert operations during the rebalance operation when there is a table wherein data indicative of the hash function values of 0, 4, 6, 7 and 9 are stored as divided in a storage 120 and data indicative of the hash function values of 1, 2, 3, 5 and 8 are stored as divided in a storage 130 as shown in FIG. 4A.

In the arrangement shown in FIG. 4A, operation 100 of search, update and delete operation is carried out in the storages 120 and 130 over data 121 to 125 and 131 to 135; and an insert operation 101 of such data 133 as to provide a hash function value of 3 is carried out in the storage 130.

Figure 4B:
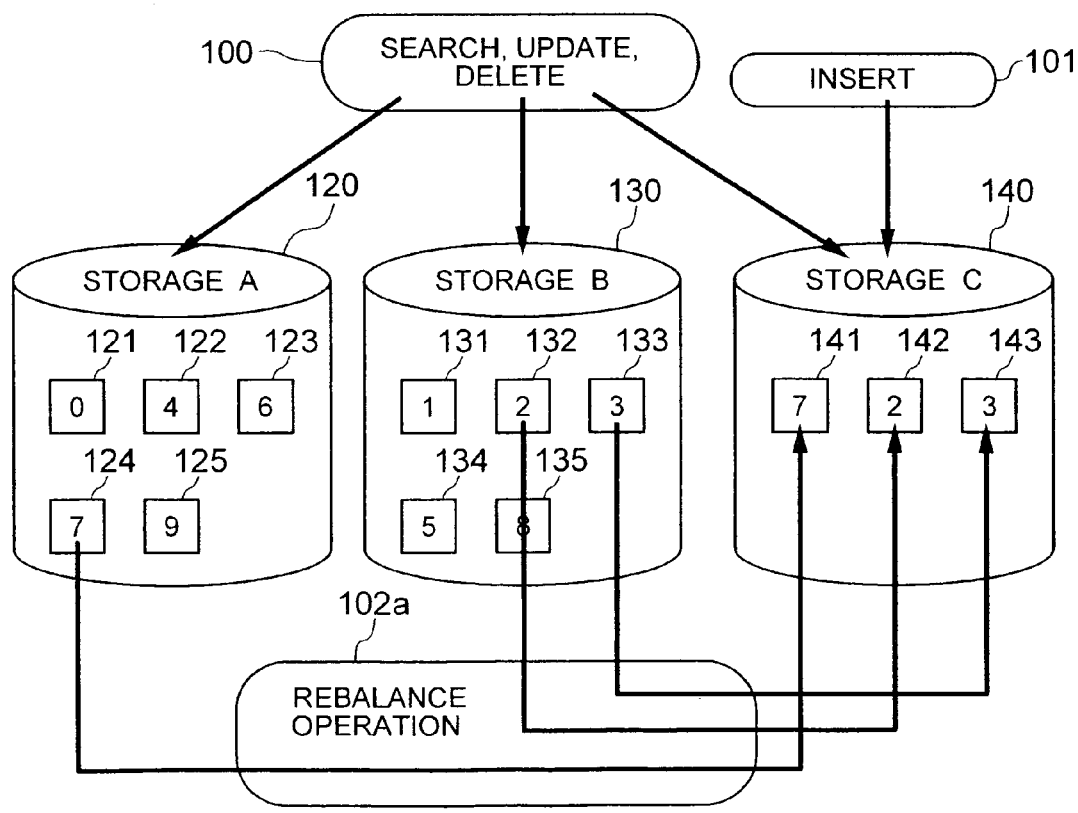

When a storage 140 was added as shown in FIG. 4B (a combination of the storages 120 and 130 is called an existing area and the storage 140 is called an additional area), a rebalance operation 102a selects data to be moved to the storage 140 from data stored in the storages 120 and 130 and moves the selected data to the storage 140 to provide hash function values of 7, 2 and 3.

This data move operation is carried out in such a procedure as to first search for data of the storages 120 and 130 to be moved, insert it in the storage 140 and then delete the data of the storages 120 and 130.

In the database system, during the operation after the search for the data to be moved until the deletion of the old data already moved, the data is locked so that another user is prohibited from searching for, updating or deleting the data.

In the present embodiment, during the execution of the rebalance operation 102a, the data operation 100 of search, update or delete is carried out in both existing and additional areas. That is, the data operation is carried out in the storages 120, 130 and 140. In this connection, during such search, update or delete operation, the data in question is locked so that the rebalance operation 102a is prohibited from referring to the data unless otherwise specifically stated by the user.

The data insert operation 101 to provide a hash function value of 3 during the rebalance operation stores the data in question in the storage 140 as an additional area to be moved.

When another user tries to search for, update or delete the data being moved through the rebalance operation 102a, he must wait until the data move operation is completed because access to the data is locked. However, after the completion of the data move operation releases the lock, he can resume the operation so far awaited.

Further, even when another user tries to move the data being searched for, updated or deleted through the rebalance operation 102a, he must wait because access to the data is locked, until the lock is released. Once the lock is released, however, he can resume the rebalance operation so far awaited.

Thus it can be prevented that data be unduly updated in its value or deleted.

During the execution of the rebalance operation 102a, data to provide a hash function value of 7 is stored in the storage 120 or 140 and data to provide hash function values of 2 and 3 is stored in the storage 120 or 140. However, since the operation 100 of search, update or delete refers to both the existing and additional areas, the operation 100 can carry out the search, update or delete operation regardless of whether the data is stored in the existing storages or additional storage.

Further, when data to be rebalanced is inserted in a rebalance destination, excessive rebalance operation to the existing areas can be avoided.

Through the above operation, it becomes possible to accept and concurrently execute search, update, delete and insert processing requests to table data during the rebalance operation.

Such processing operation will be explained in detail in connection with specific examples of FIGS. 5 to 12.

Figure 5:
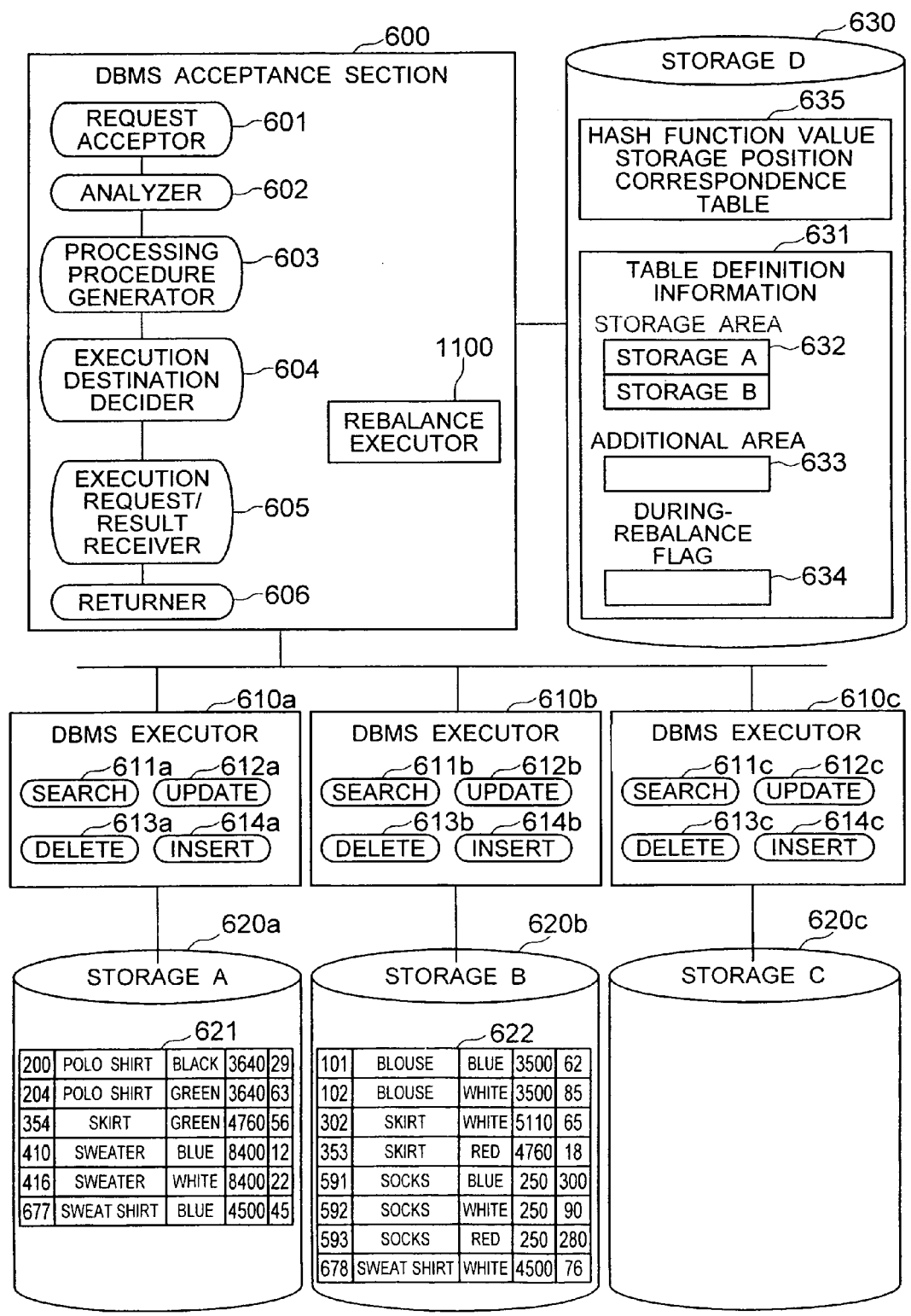
FIG. 5 is a block diagram of a first exemplary detailed arrangement of the database management system in FIG. 1; prior to the rebalance operation thereof.
Figure 7:
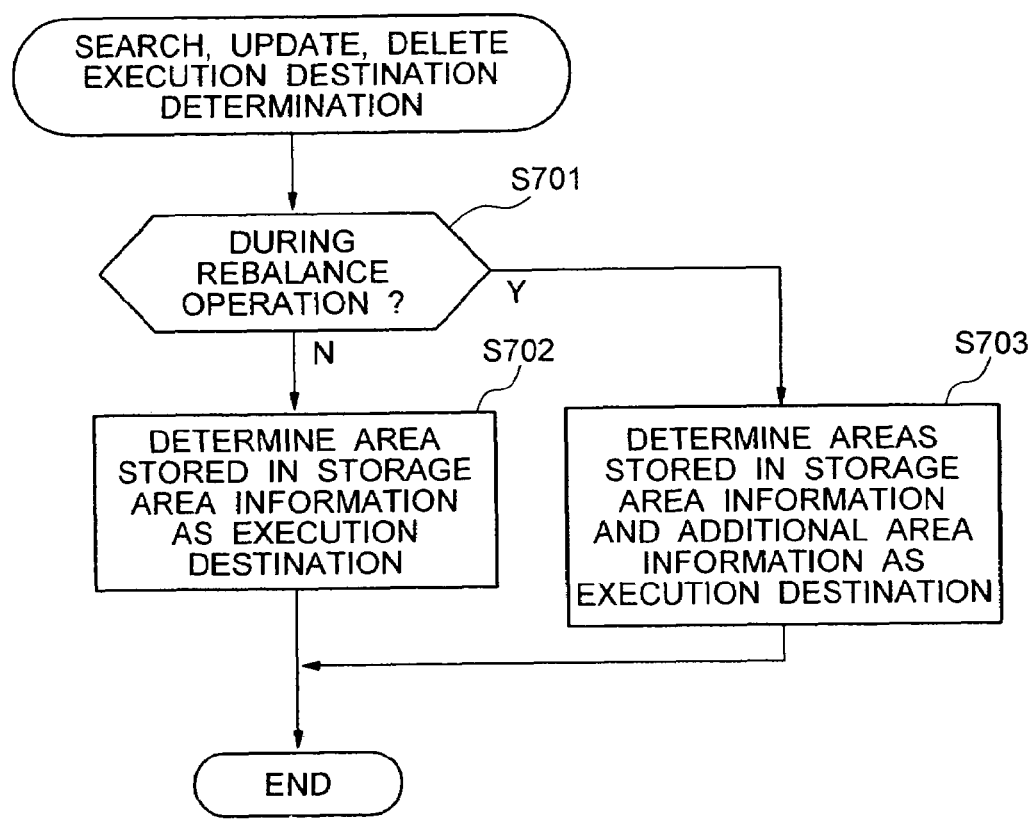
FIG. 7 is a flowchart for explaining a first example of processing operation of a DBMS acceptance section in FIG. 5.
Figure 8:
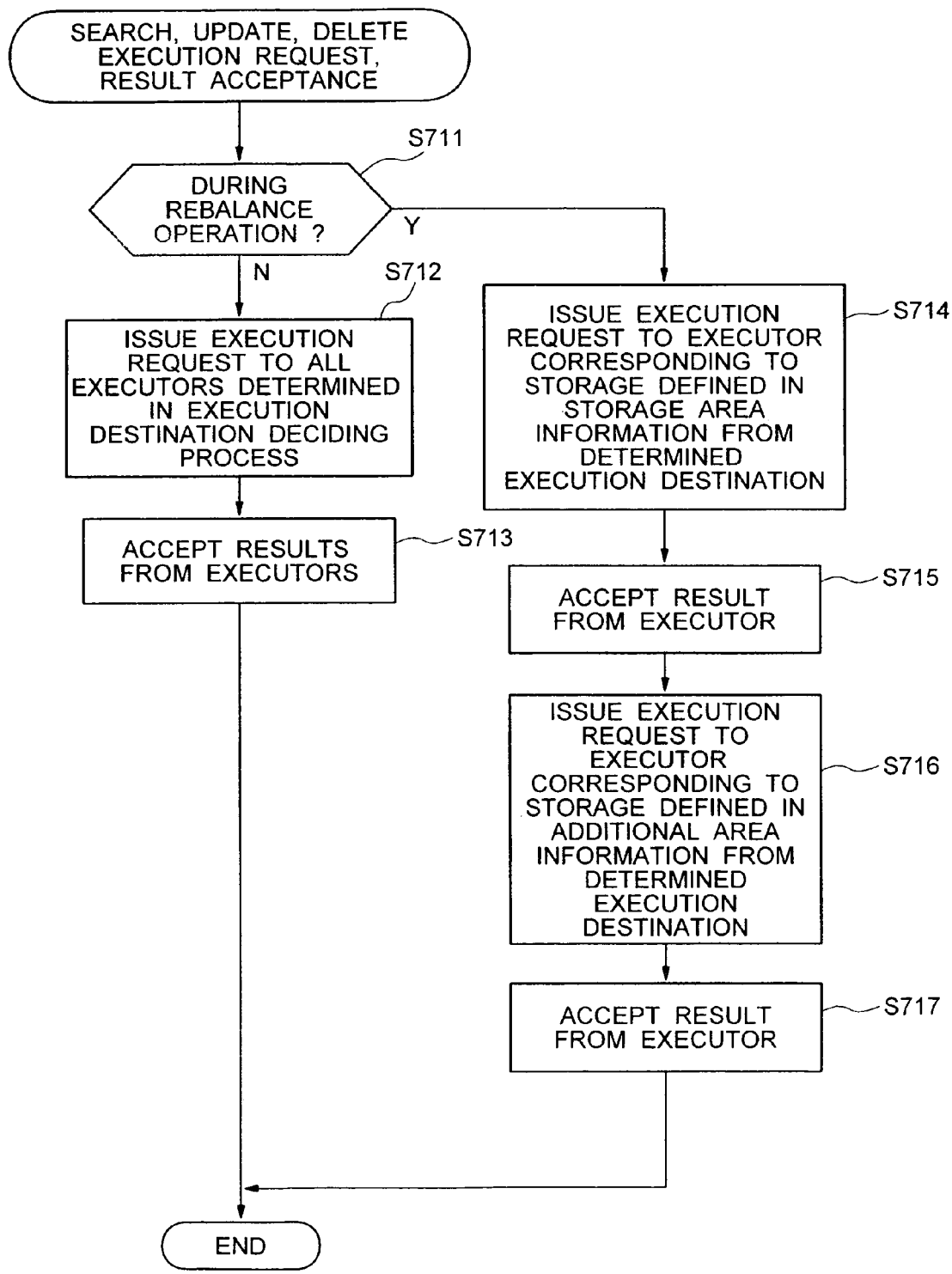
FIG. 8 is a flowchart for explaining a second example of processing operation of the DBMS acceptance section in FIG. 5.
Figure 9:
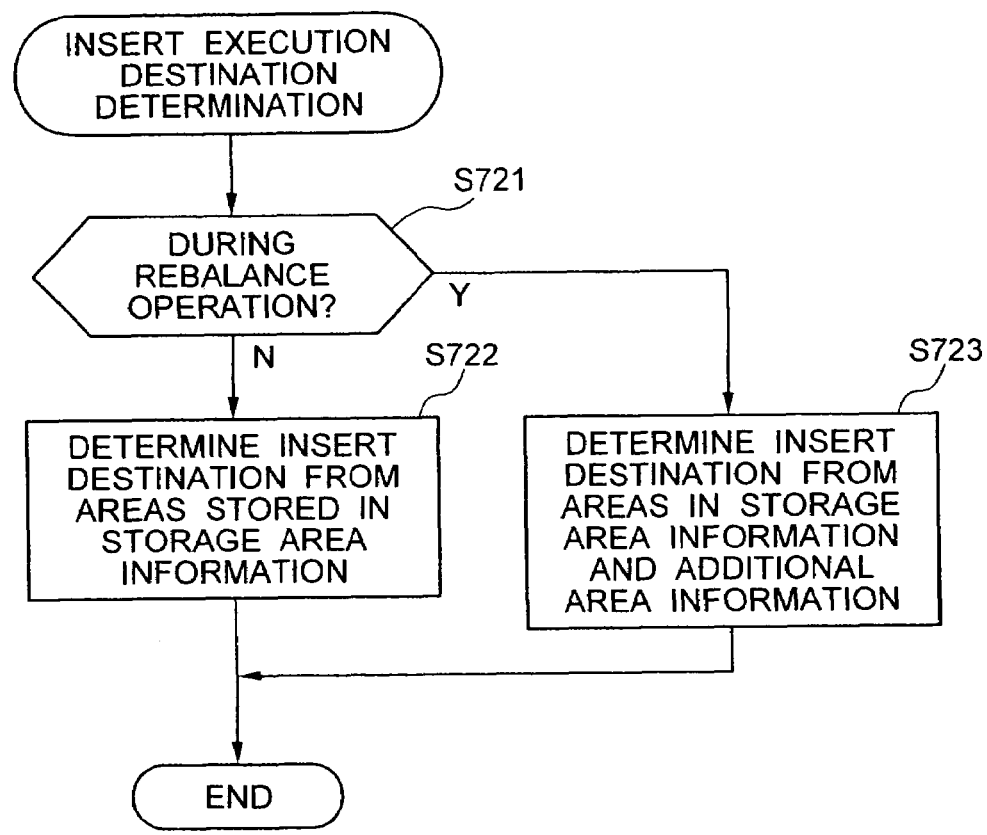
FIG. 9 is a flowchart for explaining a third example of processing operation of a DBMS acceptance section in FIG. 5.
Figure 10:
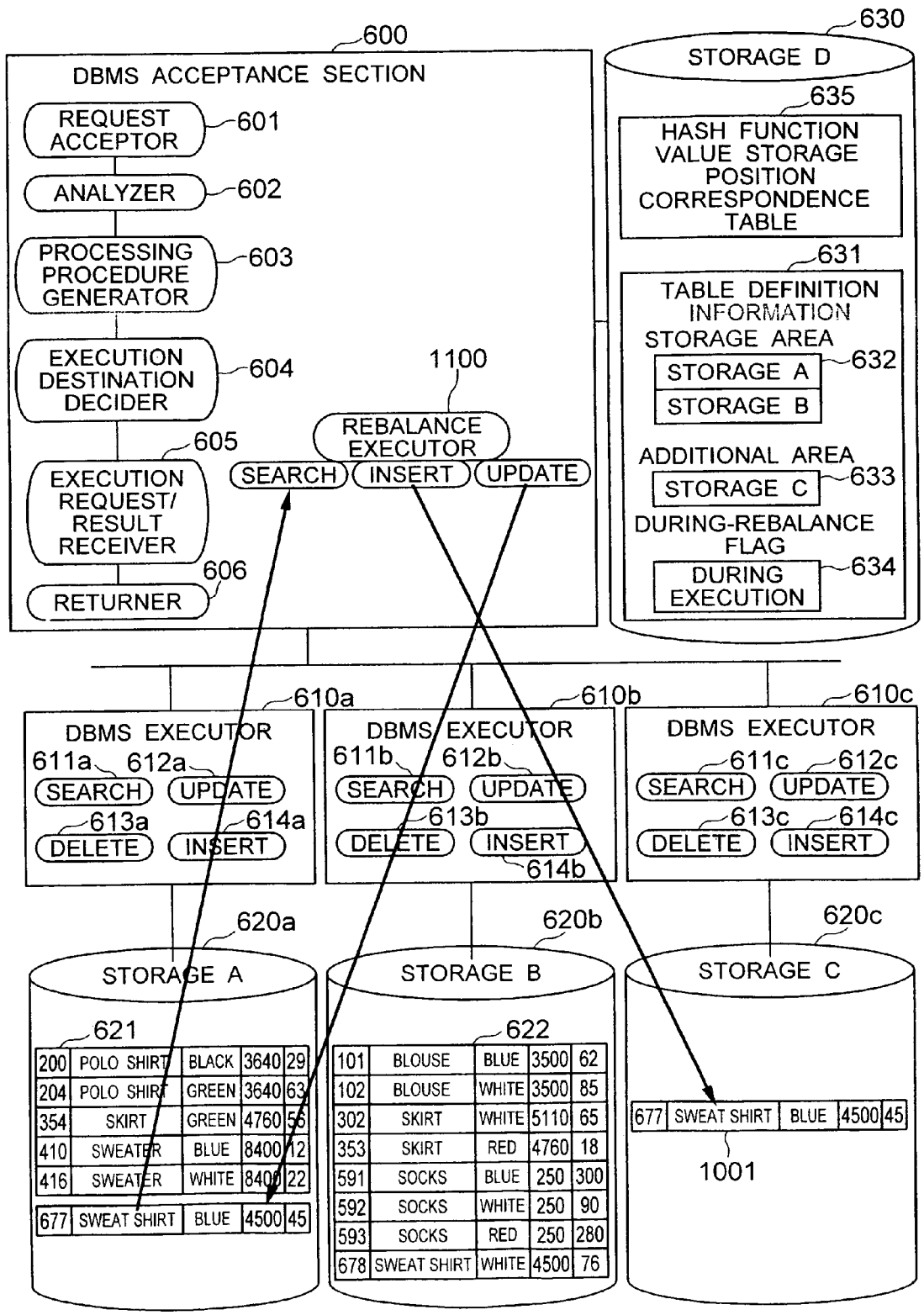
FIG. 10 is a diagram for explaining the first operational example of the database management system of FIG. 5 associated with the rebalance operation.
Figure 11A:
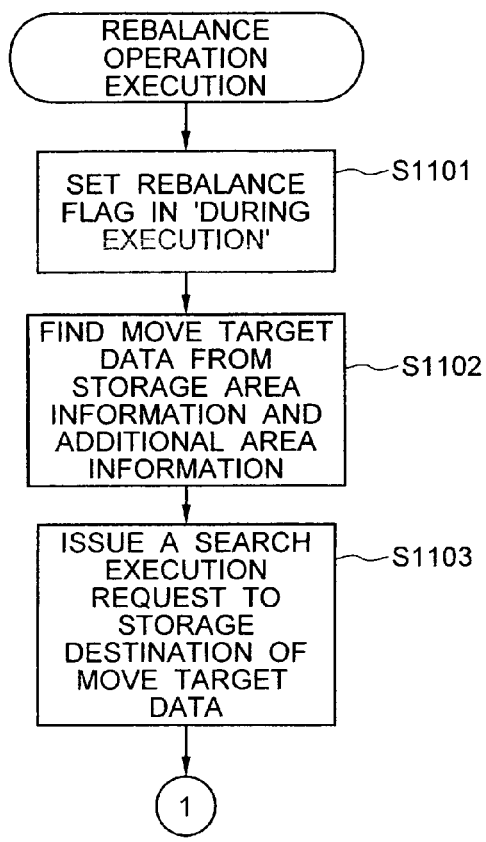
FIGS. 11A and 11B show a flowchart for explaining an example of the rebalance operation of the database management system of FIG. 10.
Figure 11B:
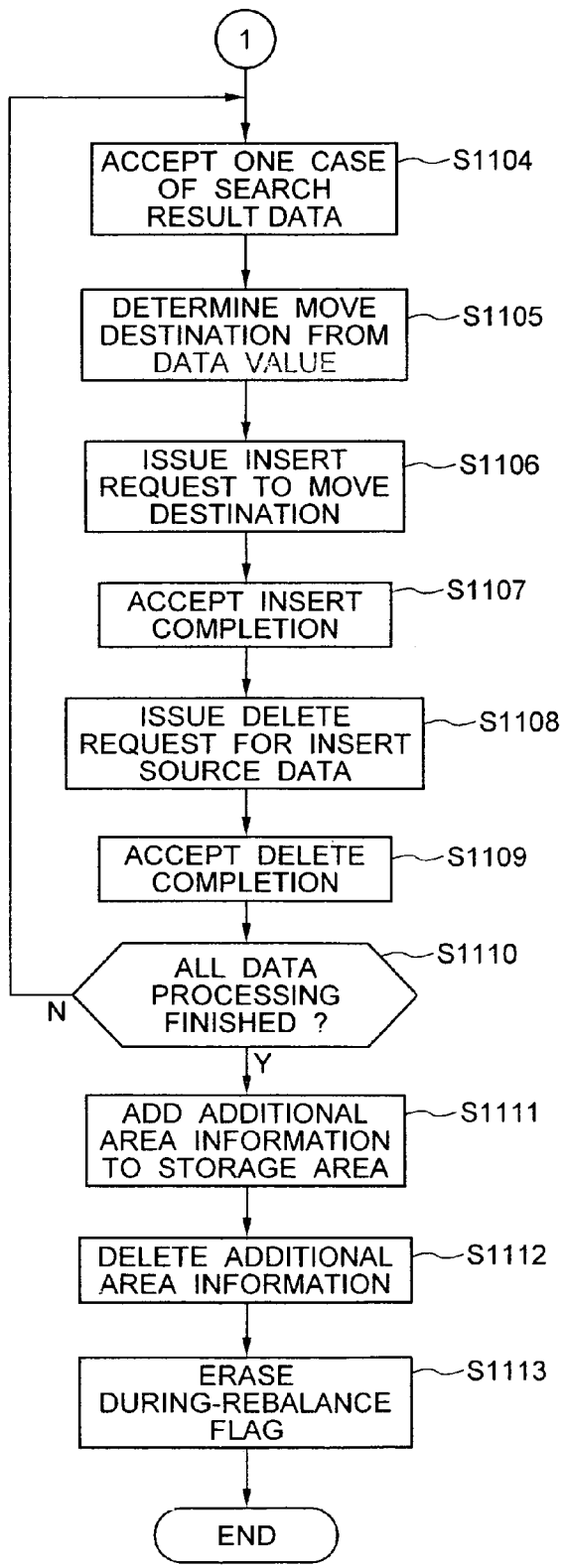
Figure 12:
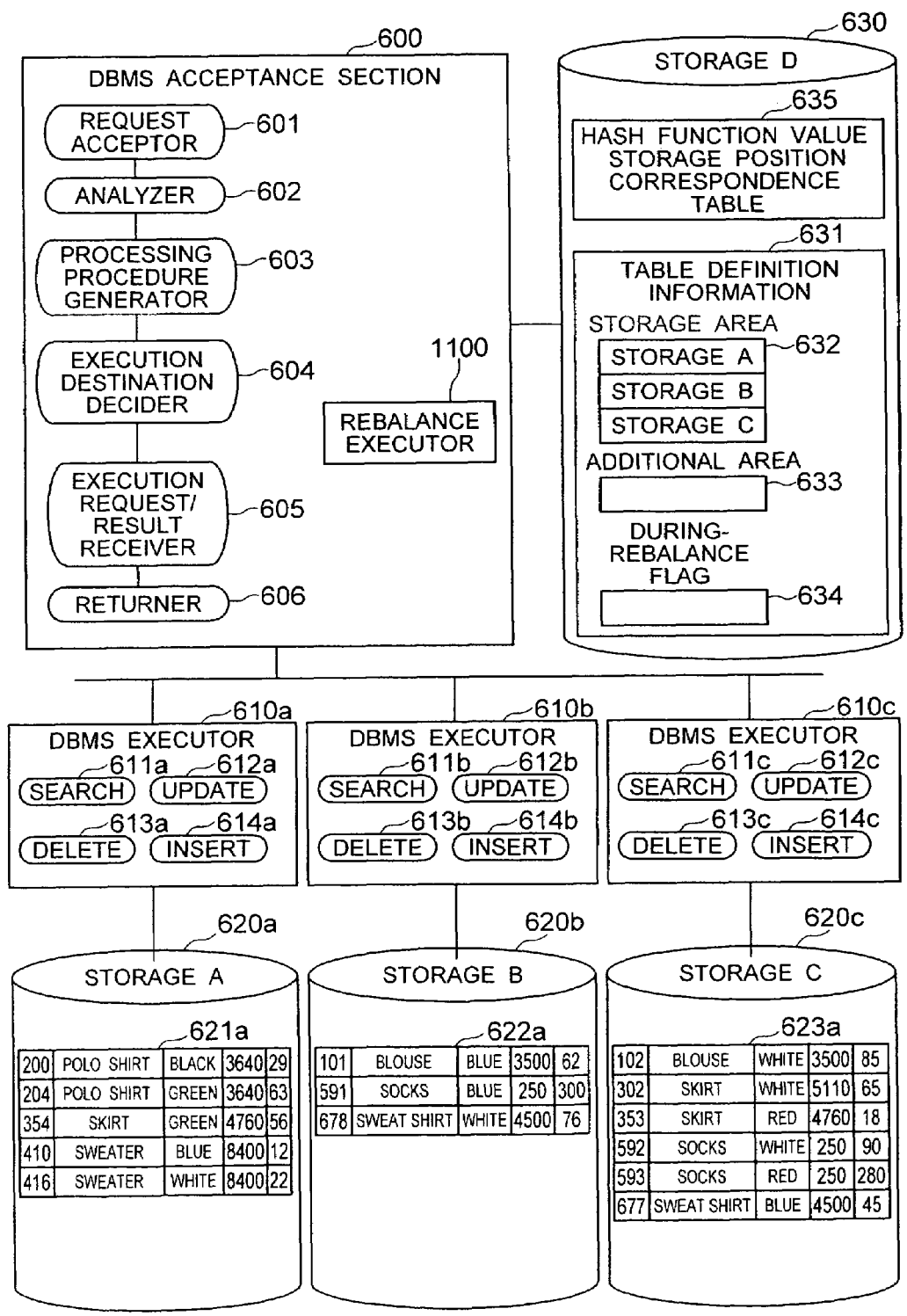
FIG. 12 is a block diagram of an exemplary detailed arrangement of the database system of FIG. 1 after the rebalance operation.

FIG. 5 is a block diagram of a first detailed example of the arrangement of the database management system in FIG. 1 prior to its rebalance operation, FIG. 6 shoes exemplary contents of a stock table to be managed by the database management system of FIG. 5, FIG. 7 is a flowchart for explaining a first example of the processing operation of a DBMS acceptance section in FIG. 5, FIG. 8 is a flowchart for explaining a second example of the processing operation of the DBMS acceptance section in FIG. 5, FIG. 9 is a flowchart for explaining a third example of the processing operation of the DBMS acceptance section in FIG. 5, FIG. 10 is a diagram for explaining the arrangement and operation of the database management system in FIG. 5 associated with the rebalance operation, FIG. 11 is a flowchart for explaining an exemplary rebalance operation of the database management system of FIG. 10, and FIG. 12 is a block diagram of an exemplary specific arrangement of the database system after the rebalance operation.

A DBMS acceptance section 600 and DBMS executors 610a to 610c in the database management system in the database system of FIG. 5 have substantially the same functions as the DBMS acceptance section 310 and DBMS executors 320a to 320c in the database management system 300 in FIG. 1.

Stored in a storage 630 connected to the DBMS acceptance section 600 are a hash function value storage position correspondence table 635 having the same contents as the hash function value storage position correspondence table 317 shown in FIG. 3 as well as table definition information 631 defined for each table. The table definition information 631 has a storage area (shown by "additional area" in the drawings) 632 indicative of a table storage place, additional area information (shown by "additional area" in the drawing) 633, and a during-rebalance flag 634 indicative of "during rebalance".

Storages 620a and 620b connected to the DBMS executors 610a and 610b respectively have storage data 621 and 622 of stock tables in the form of a database. The DBMS executors execute search, update, delete or insert operation in response to an instruction received from the DBMS acceptance section 600.

In this example, it is assumed that the number of divisions is set at 10 as a maximum, a hash function used for the division is set to have values of residues obtained when identification numbers (product codes) of products in storage data 621 and 622 are divided by the maximum division number 10.

As shown in FIG. 6, the database treated in this example is a stock table 500 associated with clothing which includes items of product code 510, product name 520, color 530, unit price 540 and stock amount 550.

When the stock table 500 of FIG. 6 is applied to the database system of FIG. 5 and data is stored as divided in the storages 620a and 620b with use of the value of the product code 510, the distribution of the hash function value storage position correspondence table 635, i.e., the hash function value storage position correspondence table 317 of FIG. 3 in the two-division case is applied to the hash function value calculated for the value of the product code 510.

As a result, data indicative of hash function values of 0, 9, 4, 6 and 7 are stored in the storage 620a, and data indicative of hash function values of 1, 8, 5, 2 and 3 are stored in the storage 620b. Further, storages A and B are defined in the storage area 632 of the table definition information 631 in the storage 630.

When a search, update or delete request is issued under this condition, the DBMS acceptance section 600 accepts the request at a request acceptor 601, analyzes the accepted request at an analyzer 602, generates a processing procedure at a processing procedure generator 603 to realize the analyzed request, and determines one or ones of the DBMS executors which execute(s) the generated processing procedure at an execution destination decider 604.

In details of the operation of the execution destination decider 604, as shown in FIG. 7, the decider first refers to the value of the during-rebalance flag 634 in the table definition information 631 of the storage 630 to judge whether or not the rebalance operation is being executed (step S701). When determining that the rebalance operation is not being executed, the decider determines the area defined in the storage area 632 as its execution destination (step S702).

In the example of FIG. 5, since the storages A and B are defined in the storage area 632, the DBMS executors 610a and 610b are determined as the execution destinations. The operation when the judgement result at the step S701 indicates that the rebalance operation is being executed will be explained later.

For the execution destinations thus determined, an execution request/result receiver 605 in the DBMS acceptance section 600 issues an execution request to the execution destinations and receives their execution results therefrom. In details of the operation of the execution request/result receiver 605, as shown in FIG. 8, the execution request/result receiver first refers to the value of the during-rebalance flag 634 and judges whether or not the rebalance operation is being executed (step S711).

When the receiver determines that the rebalance operation is not being executed, it issues a simultaneous execution request to all the DBMS executors determined by the execution destination decider 604 (step S712) and receives execution results from the DBMS executors (step S713).

The DBMS acceptance section 600 in FIG. 5 returns the last-received execution result through the operation of a returner 606. In this connection, the operation when the judgement result at the step S711 indicates that the rebalance operation is being executed will be explained later.

When an insert request is issued to the database management system in FIG. 5, the DBMS acceptance section 600 performs the operations of the request acceptor 601, analyzer 602 and processing procedure generator 603, and determines an execution destination as an insert destination at the execution destination decider 604.

In details of the operation of the execution destination decider 604 to determine an insert execution destination, as shown in FIG. 9, the decider 604 first refers to the value of the during-rebalance flag 634 in the table definition information 631 of the storage 630 in FIG. 5 and judges whether or not the rebalance operation is being executed (step S721).

When determining that the rebalance operation is not being executed, the decider calculates a hash function value on the basis of the data to be inserted, and selects an insert execution destination from the areas defined in the storage area 632 with use of the hash function value obtained by referring to the hash function value storage position correspondence table 635 (hash function value storage position correspondence table 317 in FIGS. 1 and 3) (step S722). In this connection, the operation when the result judged at the step S721 indicates the rebalance operation is being executed will be explained later.

In the example of FIG. 5, the DBMS acceptance section refers to the value of the product code of the insert data and finds a hash function value. When the hash function values are 0, 9, 4, 6 and 7, the DBMS acceptance section selects the storage 620a; while, when the hash function values are 1, 8, 5, 2 and 3, the DBMS acceptance section selects the storage 620b.

For the insert destination thus selected, the DBMS acceptance section 600 issues an insert execution request and receives its result from and at the execution request/result receiver 605, and returns the last-received result from the returner 606.

In the database management system of FIG. 5, when a storage 620c is added as a storage area of the stock table as shown in FIG. 10, a storage C is defined in the additional area information 633 of the storage 630, a rebalance operation request is generated, and the operation of a rebalance executor 1100 is started.

Explanation will be made as to details of the rebalance operation of the rebalance executor 1100 with reference to FIG. 11. More specifically, the rebalance executor set the during-rebalance flag 634 in the table definition information 631 of the storage 630 in FIG. 5 at "during execution of the rebalance operation" (step S1101), finds the numbers of divisions before and after the area addition by referring to the storage area information 632 and additional area information 633, and finds data to be moved by referring to the hash function value storage position correspondence table 635 (step S1102).

A single area is added to change the system from the two-division type to a three-division type in FIG. 10. Thus it will be appreciated that data indicative of the hash function values of 2, 7 and 3 is to be moved on the basis of the hash function value storage position correspondence table 635 (hash function value storage position correspondence table 317 of FIG. 3).

The rebalance executor 1100 issues a data search request to the DBMS executor having the to-be-moved data thus found and stored therein (step S1103). In FIG. 10, since data indicative of the hash function value of 7 to be moved is stored in the storage 620a and data indicative of the hash function values of 2 and 3 are stored in the storage 620b, the rebalance executor issues a search request to the DBMS executors 610a and 610b.

The DBMS executors 610a and 610b when receiving the search request from the rebalance executor 1100 searches for one case of data and return its result to the DBMS acceptance section 600.

In FIGS. 11A and 11B, the DBMS acceptance section 600 accepts the data corresponding to one case returned from the DBMS executors 610a and 610b (step S1104), calculates a hash function value based on the value of the accepted data, finds a move destination by referring to the hash function value storage position correspondence table 635 (step S1105), and issues an insert request to the DBMS executor as the move destination (step S1106).

The DBMS executor when receiving the insert request executes data insert operation and informs the DBMS acceptance section 600 of its insert completion (step S614). The DBMS acceptance section 600 accepts a notification indicative of the data insert completion (step S1107) and issues a delete request to delete the insert original data (step S1108).

For example, in the case of the rebalance executor 1100 in FIG. 10, the DBMS executor 610a searches for data 1000 having a product code value of 677 and returns it to the DBMS acceptance section 600. Since the data move destination is the storage 620c, the rebalance executor 1100 issues an insert request to the DBMS executor 610c to store data 1001 in the storage 620c.

After the insert completion, the rebalance executor 1100 issues a request to the DBMS executor 610a to delete the data 1000 having a product code value of 677.

When the DBMS executor 610a receives the delete request from the rebalance executor 1100, a delete 613a in the DBMS executor 610a deletes the corresponding data. After completing the delete operation, the DBMS executor 610a informs the DBMS acceptance section 600 of the delete completion. The DBMS acceptance section 600 accepts the data delete completion notification (step S1109), and extracts next search data and examines the presence or absence of the next search data (step S1110).

In the presence of the next data, the DBMS acceptance section 600 accepts data at the steps S1110 to S1104 and repetitively performs the insert and delete operations until the data becomes null. When the next data becomes null and the move operation of all the data is fully terminated, the DBMS acceptance section 600 adds contents of the additional area information 633 in the storage area 632 (S1111), deletes contents of the additional area information 633 (S1112), and erases the during-rebalance flag 634 (S1113).

After the rebalance operation is completed in this way, storage data 621a is stored in the storage 620a, storage data 622 is stored in the storage 620b, and storage data 623 is stored in the storage 620c, as shown in FIG. 12.

Explanation will next be made as to the operation of the system when a data search, update and delete request and a data insert request are issued during the rebalance operation, that is, as to the database management method according to the present invention.

Explanation will first be made in connection with a case where a data search, update and delete request was issued. In the DBMS acceptance section 600 in FIG. 10, in this case, the request acceptor 601, analyzer 602 and processing procedure generator 603 performs their operations and the execution destination decider 604 performs its execution destination determining operation. In the execution destination determining operation, the DBMS acceptance section 600 refers to the during-rebalance flag and judges whether or not the rebalance operation is being executed as shown in FIG. 7.

At this time, if the rebalance operation is being executed, then the DBMS acceptance section 600 determines the areas defined in the storage area 632 and additional area information 633 of the table definition information 631 in the storage 630 as execution destinations (step S703). In the example of FIG. 10, since the storages 620a and 620b are defined in the storage area 632 as storages A and B and the storage 620c is defined in the additional area 633 as the storage C, the DBMS executors 610a, 610b and 610c are determined as execution destinations.

For the execution destinations thus determined, the execution request/result receiver 605 in the DBMS acceptance section 600 performs its execution request/result receiving operation, which will be explained by referring to FIG. 8.

That is, the DBMS acceptance section 600 refers to the during-rebalance flag 634 in the table definition information 631 of the storage 630 and judges whether or not the rebalance operation is being executed (step S711). Since the rebalance operation is being executed, the DBMS acceptance section 600, on the basis of the execution destination determined at the step S703 in the execution destination determination process of FIG. 7, first issues an execution request to the DBMS executors associated with the storages defined in the storage area 632 (step S714).

When accepting execution results from all the DBMS executors as the execution request destinations (step S715), the DBMS acceptance section 600 issues a execution request to the DBMS executor associated with the storage defined in the additional area 633 (step S716) and receives an execution result from the DBMS executor subjected to the execution request (step S717).

The DBMS acceptance section 600 returns the last received result through the operation of the step S606.

In the example of FIG. 10, the storages 620a and 620b are defined in the storage area 632 in the table definition information 631 of the storage 630 and the storage 620c is defined in the additional area 633. Thus the DBMS acceptance section 600 first issues a search, update and delete execution request to the DBMS executors 610a and 610b, and after receiving all their results therefrom, the DBMS acceptance section issues the search, update and delete execution request to the DBMS executor 610c and receives its result.

When an insert request is issued during the rebalance operation, the DBMS acceptance section 600 performs the operations of the request acceptor 601, analyzer 602, processing procedure generator 603 and execution destination decider 604 in FIG. 10, and the operation of the execution destination decider 604 is as shown in FIG. 9.

That is, in the step S721 wherein the during-rebalance flag is referred to to judge whether or not the rebalance operation is being executed, since the rebalance operation is being executed, the DBMS acceptance section 600 finds a hash function value based on the data to be inserted, refers to the hash function value storage position correspondence table 635, and selects an insert destination from the areas defined in the storage area information 632 and additional area 633 on the basis of the hash function values (step S723).

In the example of FIG. 10, the DBMS acceptance section 600 refers to the value of the product code for the data to be inserted and finds hash function values. When the hash function values are 0, 9, 4 and 6, the DBMS acceptance section selects the storage 620a. When the hash function values are 1, 8 and 5, the DBMS acceptance section selects the storage 620b. When the hash function values are 2, 7 and 3, the acceptance section selects the storage 620c.

And in the DBMS acceptance section 600, the execution request/result receiver 605 performs its operation over the selected insert destination and the section 600 returns the last-received result from the returner 606.

Such data being searched for, updated, deleted or inserted is locked, so that it is prohibited that another user or rebalance operation performs search, update or delete operation thereover, unless otherwise specifically stated by the user. Similarly, data to be subjected to a move operation for each data case during the rebalance operation is also locked, so that another user is prohibited from performing search, update or delete operation thereover until the move operation is completed.

All the storages having data stored therein have been checked in order to determine the execution destination of the search, update or delete operation in the present embodiment. When the search, update or delete operation is added with a condition, however, the check can be carried out over only limited one of the storages as the execution destination. When the storages as the execution destination are limited in the search, update or delete operation during the rebalance operation, it is only required to perform update or delete operation over the additional area, only when data to be rebalanced is stored in the storage of the execution destination.

Through the above operation, even when another user issues a search, update or delete processing request during rebalance operation, the system can accept the search, update or delete processing request to node table data during the rebalance operation and sequentially execute the DBMS executors.

Explanation will next be made as to a database system in accordance with another embodiment of the present invention. In this database system, when data stored in existing storages determined by hash division is subjected to rebalance operation due to addition of a storage, for example, the system copies the data determined to be moved from the existing storages to the additional storage, adds position information of the data on the additional storage to the data within the storages as copy sources, and, after completing the copying operation of all the data to be moved to the additional storage, deletes all the data of the copy sources.

And when a search request to the table data is issued during the execution of the data rebalance operation, the system performs searching operation over the data stored in the existing storages. When an update/delete request to the table data is issued during the rebalance operation, the system first processes the data stored in the existing storages as update/delete object. When position information indicative of a copy destination to the additional storage is added to the data to be updated and deleted, the system performs the same update/delete operation over the data of the copy destination.

Further, when an insert request to the table data is issued during the execution of the rebalance operation and the data in question is to be moved to the additional storage, the system stores the insert data in the existing storages and also even in the additional storage as a move destination, and adds storage position information to the additional storage to the data stored in the existing storages.

The basic arrangement of the database system performing such operation as mentioned above is the same as that of the system of FIG. 1, or may be the same as that of the system of FIG. 2.

By referring to FIGS. 13 to 21, explanation will be made as to the operation of a database system as a second embodiment which has such an arrangement as mentioned above, and wherein data division is based on the hash function value storage position correspondence table 317 shown in FIGS. 1 and 3 and the stock table of FIG. 6 is applied to the database system of FIG. 1.

Figure 13:
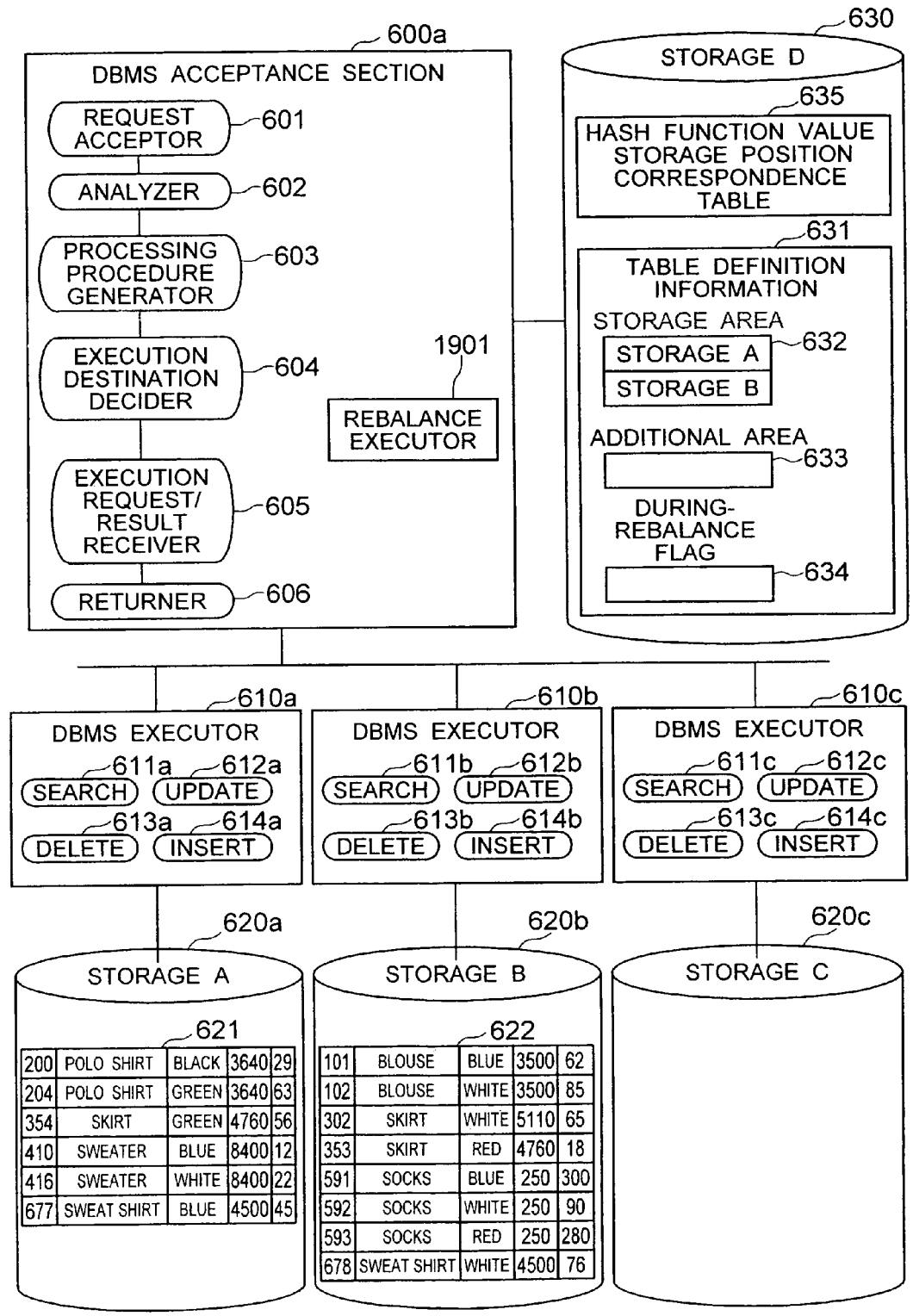
FIG. 13 is a block diagram of a second exemplary detailed arrangement of the database management system in FIG. 1 prior to the rebalance operation.
Figure 14:
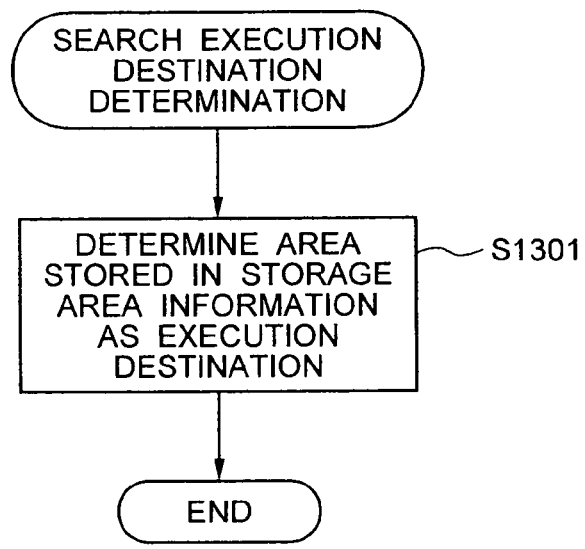
FIG. 14 is a flowchart for explaining an example of search execution target determining operation of a DBMS acceptance section in FIG. 13.
Figure 15:
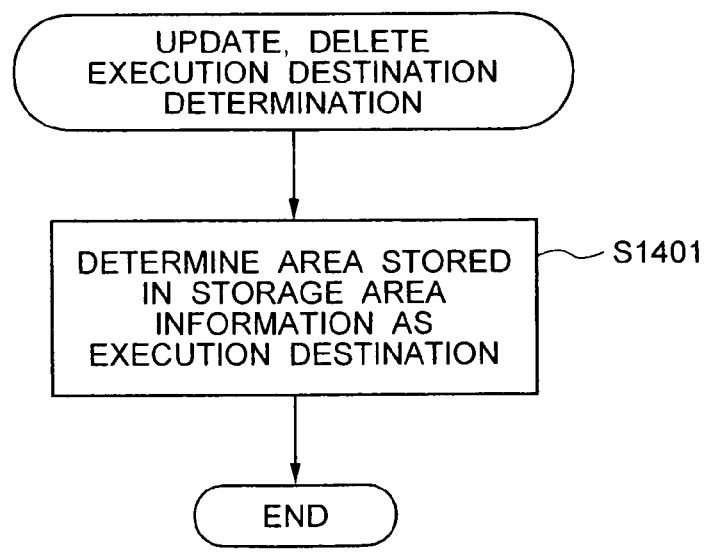
FIG. 15 is a flowchart for explaining an example of update/delete execution target determining operation of the DBMS acceptance section in FIG. 13.
Figure 16:
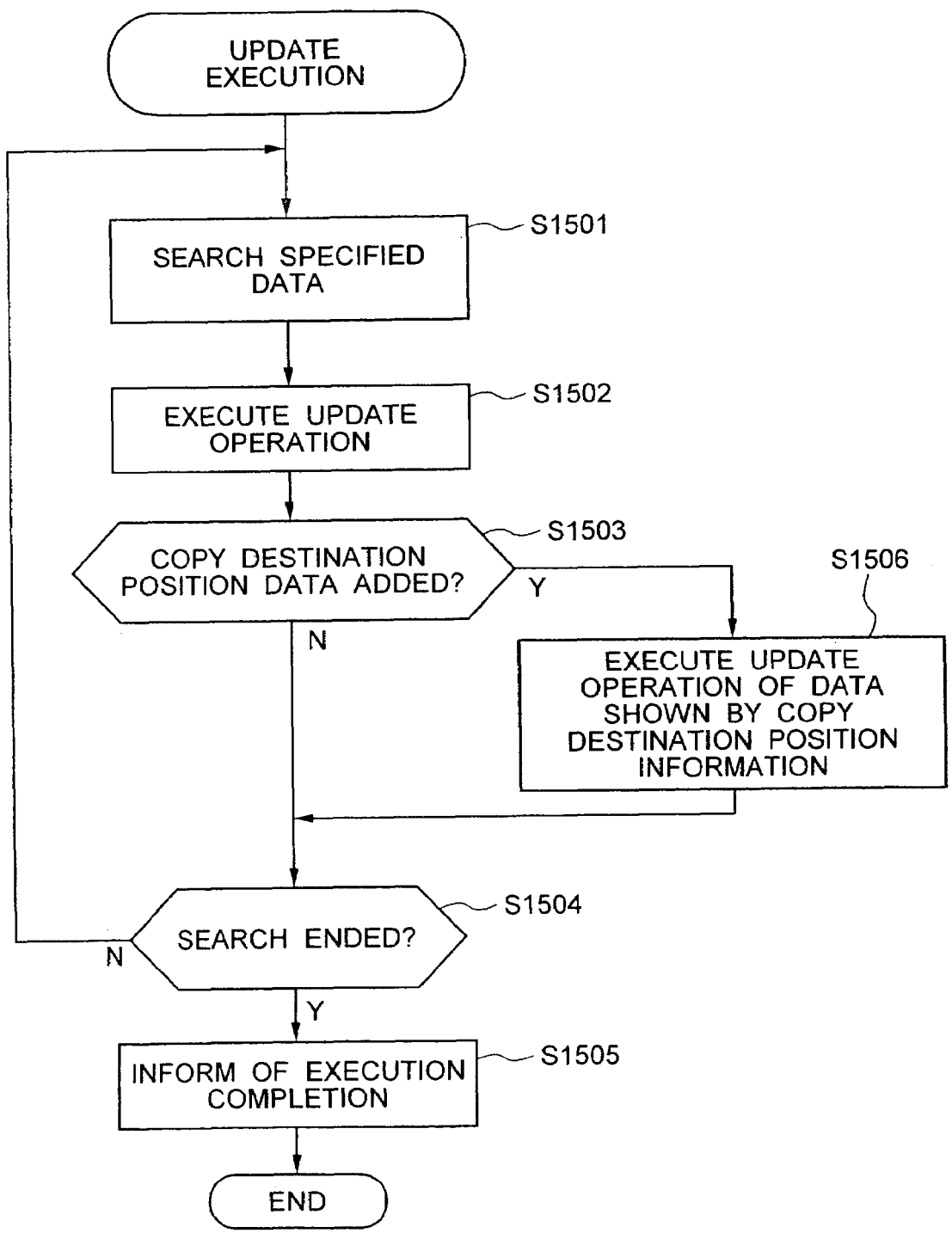
FIG. 16 is a flowchart for explaining an example of update execution target determining operation of the DBMS acceptance section in FIG. 13.
Figure 17:
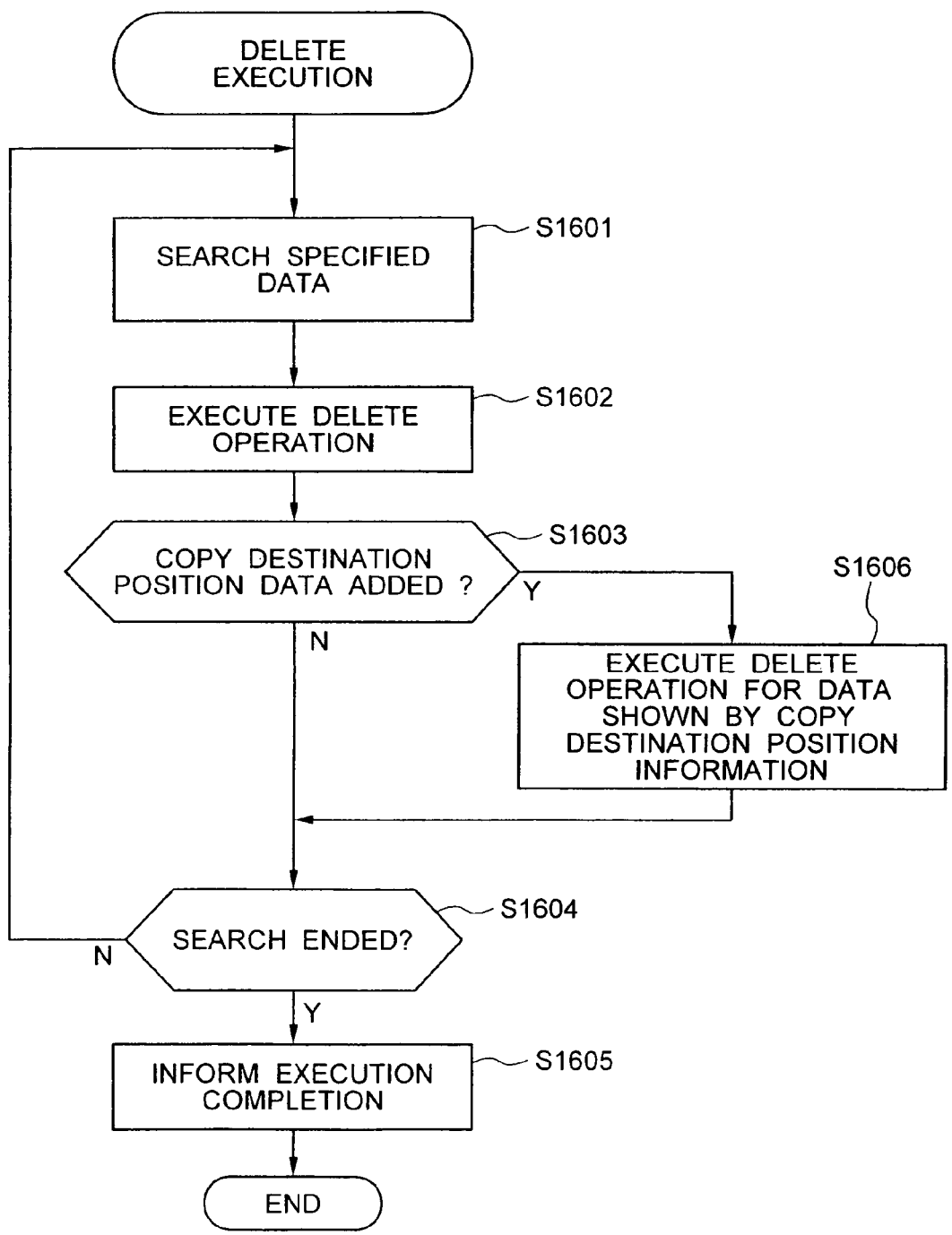
FIG. 17 is a flowchart for explaining an example of delete execution target determining operation of the DBMS acceptance section in FIG. 13.
Figure 18:
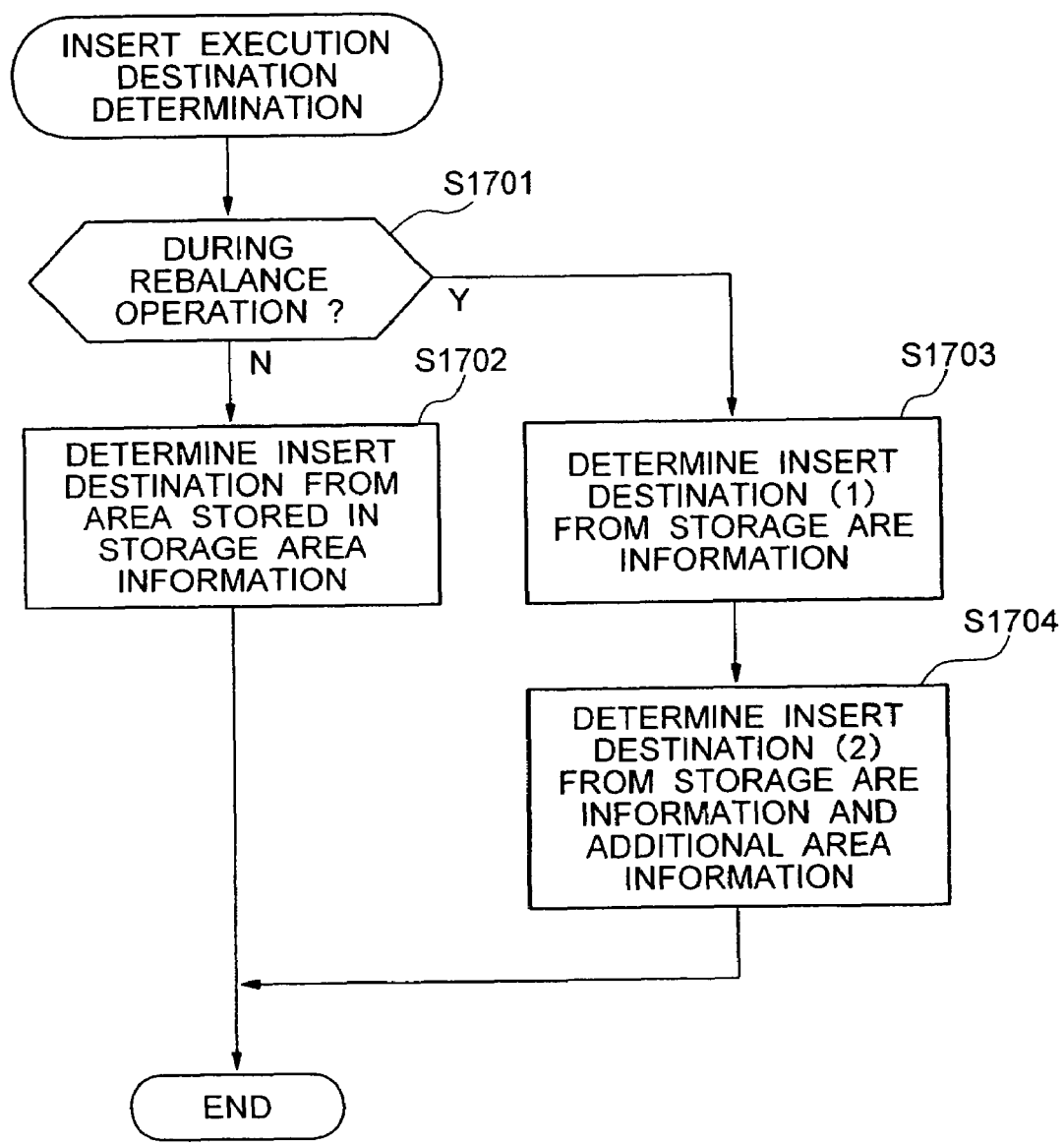
FIG. 18 is a flowchart for explaining an example of insert execution target determining operation of the DBMS acceptance section in FIG. 13.
Figure 19:
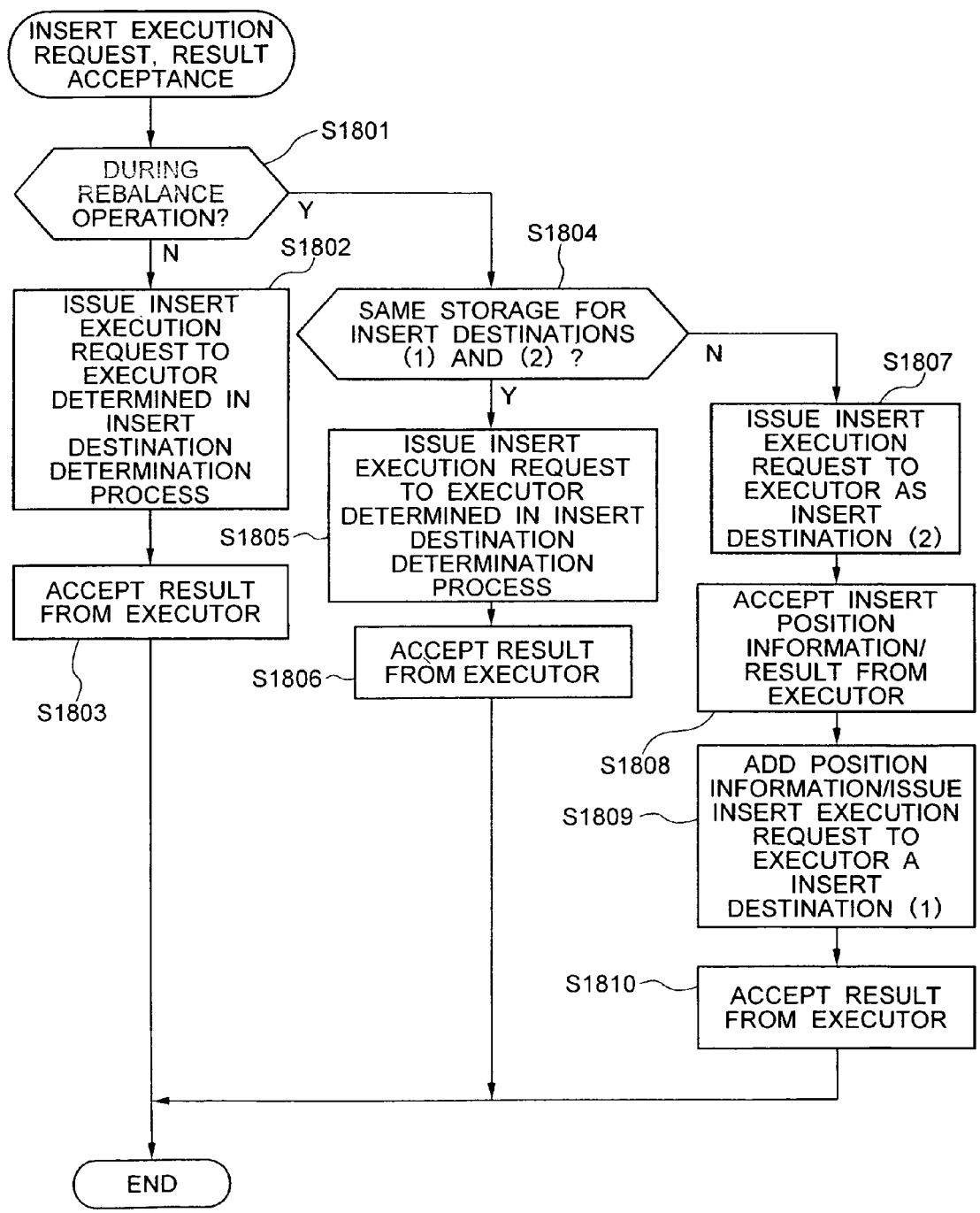
FIG. 19 is a flowchart for explaining another example of insert execution target determining operation of the DBMS acceptance section in FIG. 13.
Figure 20:
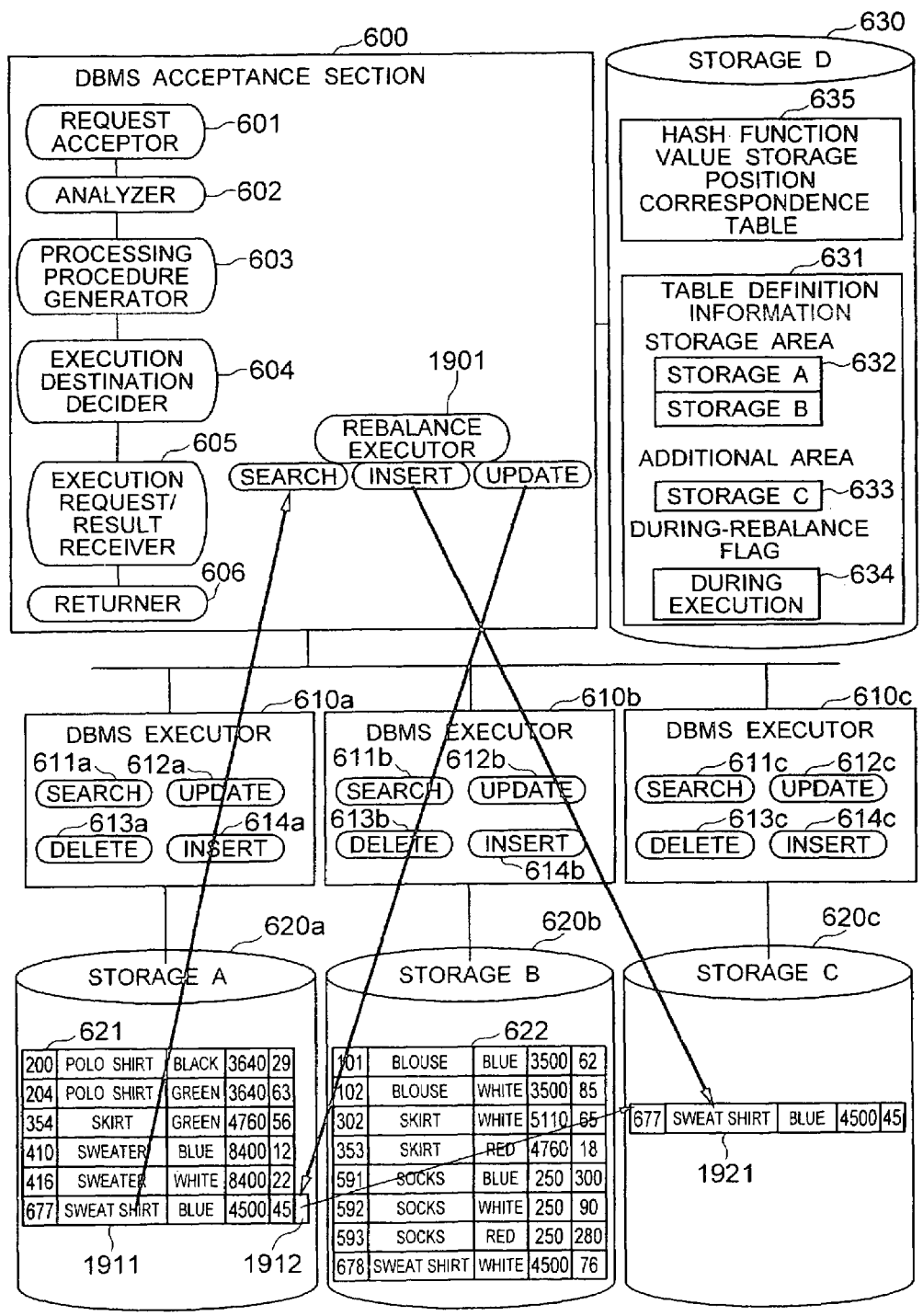
FIG. 20 is a diagram of another exemplary arrangement of the database management system of FIG. 13 associated with the rebalance operation.
Figure 21A:
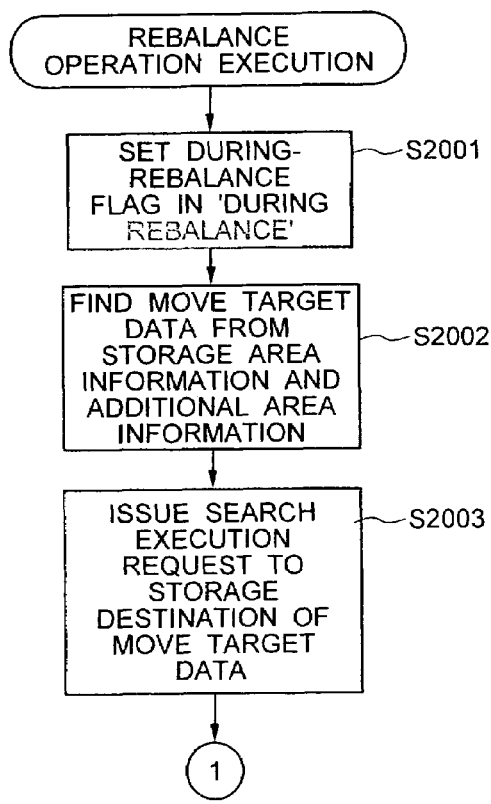
FIGS. 21A and 21B shows a flowchart for explaining an example of rebalance operation of the database management system of FIG. 20.
Figure 21B:
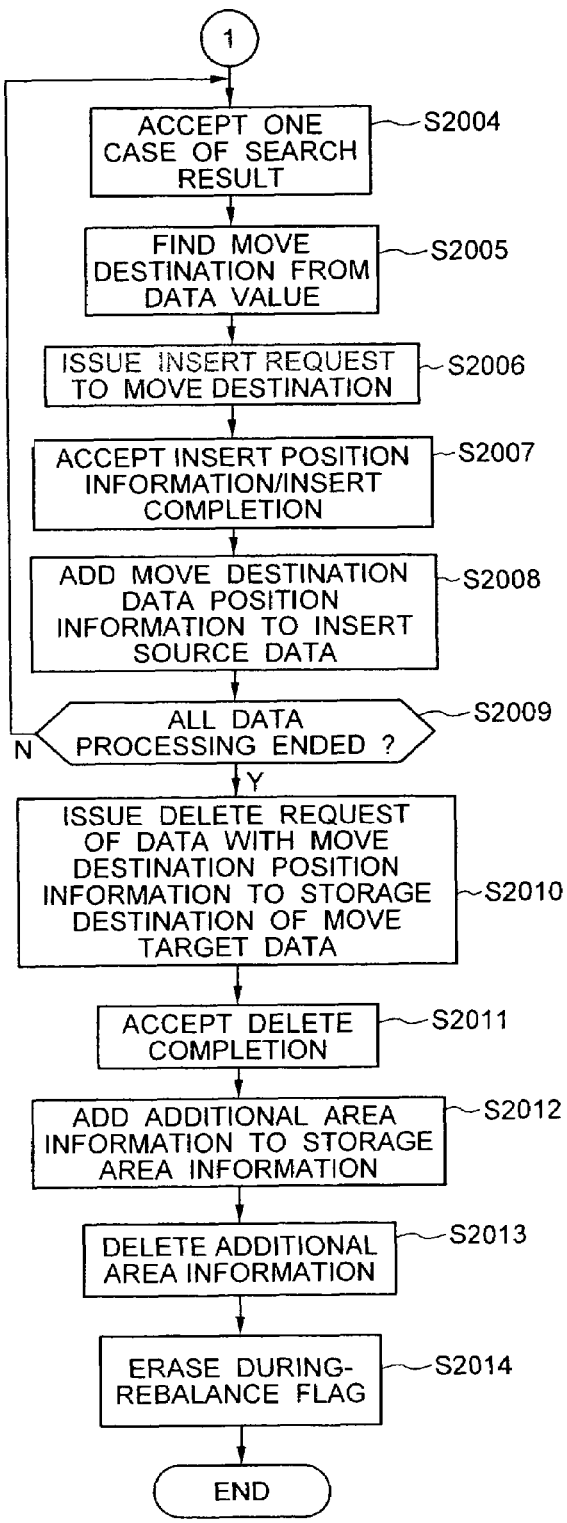

FIG. 13 is a block diagram of a second detailed example of the arrangement of the database management system in FIG. 1 prior to rebalance operation, FIG. 14 is a flowchart for explaining an example of search execution destination determining operation of a DBMS acceptance section in FIG. 13, FIG. 15 is a flowchart for explaining an example of update/delete execution destination determining operation of the DBMS acceptance section in FIG. 13, FIG. 16 is a flowchart for explaining an example of update execution destination determining operation of the DBMS acceptance section in FIG. 13, FIG. 17 is a flowchart for explaining an example of delete execution destination determining operation of the DBMS acceptance section in FIG. 13, FIG. 18 is a flowchart for explaining an example of insert execution destination determining operation of the DBMS acceptance section in FIG. 13, FIG. 19 is a flowchart for explaining an example of insert execution destination determining operation of the DBMS acceptance section in FIG. 13, FIG. 20 is a diagram of the database management system of FIG. 13 for explaining the rebalance operation thereof, FIG. 21 is a flowchart for explaining an example of the rebalance operation of the database management system of FIG. 20, and FIG. 22 is a diagram for explaining a second example of accepting and executing a database processing request during the rebalance operation in the database system of FIG. 1.

In the database system of FIG. 13, when a search request is issued, a DBMS acceptance section 600a performs respective operations of the request acceptor 601, analyzer 602 and processing procedure generator 603, and determines an execution destination through the operation of the execution destination decider 604. In the execution destination determining operation of this example, the areas defined in the storage area 632 are merely determined to be the execution destinations as detailed in FIG. 14 (step S1301).

In the example of FIG. 13, since the storages A and B are defined in the storage area 632, the DBMS executors 610a and 610b are determined as the execution destinations. And the DBMS acceptance section 600a issues a search execution request from the execution request/result receiver 605 to the execution destinations thus determined, receives their results, and returns the last-received result thereto from the returner 606.

Even with respect to data update or delete, when its request is issued, the DBMS acceptance section 600a performs the respective operations of the request acceptor 601, analyzer 602 and processing procedure generator 603, and determines an execution destination through the operation of the execution destination decider 604. In the execution destination determining operation, as in the search request, the areas defined in the storage area 632 are merely determined as execution destinations as shown in FIG. 15 (step S1401).

In the example of FIG. 13, since the storages A and B are defined in the storage area 632, the DBMS executors 610a and 610b are determined as the execution destinations. And the DBMS acceptance section 600a issues an update/delete execution request from the execution request/result receiver 605 to the execution destinations thus determined, receives their results, and returns the last-received result from the returner 606.

The DBMS executors 610a and 610b search for the data to be updated/deleted (steps S1501 and SA1601) and execute the update/delete operation through the operations of updates 612a and 612b and deletes 613a and 613b (steps S1502 and S1602) as shown in FIGS. 16 and 17.

Further, the DBMS executor refers to the update/delete data and judges whether or not position information indicative of a copy destination is added to the data (steps S1503 and S1603). If the position information indicative of the copy destination is added, then the DBMS executor executes the update/delete operation over data to be copied (steps S1506 and S1606).

Thereafter or in the steps S1503 and S1603, when the position information is not added, the DBMS executor extracts the data to be next updated/deleted and judges whether or not the next data is present (steps S1504 and S1604). In the presence of the next data, the DBMS executor repeats the operations of the steps S1501 and S1601 and subsequent steps until the data is fully searched for. In the absence of the next data, when the searching operation of all the data is completed, the DBMS executor informs the DBMS acceptance section 600a of the execution completion (steps S1505 and S1605).

When an insert request is issued, the DBMS acceptance section 600a in FIG. 13 performs the operations of the request acceptor 601, analyzer 602 and processing procedure generator 603, and determines an insert destination through the operation of the execution destination decider 604. In this example, the insert destination determining operation is as shown in FIG. 18.

More specifically, the DBMS acceptance section first refers to the during-rebalance flag 634 and judges whether or not the rebalance operation is being executed (step S1701). In this case, the DBMS acceptance section determines that the rebalance operation is not being executed, finds a hash function value from the data to be inserted, refers to the hash function value storage position correspondence table 635 (hash function value storage position correspondence table 317 in FIGS. 1 and 3), and selects an insert destination from the areas defined in the storage area 632 on the basis of the hash function value (step S1702).

In the example of FIG. 13, the DBMS acceptance section refers to the value of a product code for the insert data and finds its hash function value. When the hash function values are 0, 9, 4, 6 and 7, the DBMS acceptance section selects the storage 620a. When the hash function values are 1, 8, 5, 2 and 3, the DBMS acceptance section selects the storage 620b.

The DBMS acceptance section 600a issues an insert execution request from the execution request/result receiver 605 to the selected insert destination and receives its result therefrom. The execution request issuance and result reception are carried out according to a procedure as shown in FIG. 19.

More specifically, the DBMS acceptance section 600a in FIG. 13 refers to the during-rebalance flag 634 and judges whether or not the rebalance operation is being executed (step S1801). When the rebalance operation is not executed, the DBMS acceptance section issues an insert execution request to the DBMS executor associated with the storage selected through the deciding operation of the execution destination decider 604 (step A1802), and receives its result therefrom (step S1803). And the DBMS acceptance section returns the last-received result. The operation of the DBMS acceptance section when determining that the rebalance operation is being executed will be explained later.

As in the case of the example of FIG. 10, when the storage 620c as a storage area of the stock table is added to the database system of FIG. 13 as shown in FIG. 20, a storage C is defined in the additional area 633 of the storage 630 and the operation of a rebalance executor 1901 is started by a rebalance operation request.

In the rebalance operation, as shown in FIG. 21, DBMS acceptance section first sets the during-rebalance flag 634 in FIG. 13 in 'during rebalance' during the execution of the rebalance operation (step S2001), refers to the storage area information 632 and additional area information 633, finds the number of divisions before the area addition and the number of division after the area division, refers to the hash function value storage position correspondence table 635 (hash function value storage position correspondence table 317 in FIGS. 1 and 3), and finds data to be moved (step S2002).

In the example of FIG. 20, since a single area is added to the two division tables to form three division tables, it will be appreciated that data having hash function values of 2, 7 and 3 is to be moved from the hash function value storage position correspondence table 317 of FIG. 3.

Next, the DBMS acceptance section issues a data search request to the DBMS executor having the move data found at the step S2002 (step S2003). In the example of FIG. 20, since the hash function value of 7 for the move data is stored in the storage 620a and the hash function values of 2 and 3 are stored in the storage 620b, the DBMS acceptance section issues the search request to the DBMS executors 610a and 610b.

The DBMS executors 610a and 610b when receiving the search request from the DBMS acceptance section 600a search for one case of data and return its result to the DBMS acceptance section 600a. The DBMS acceptance section 600a receives one case of result in the rebalance executor 1901 (step S2004), calculates a hash function value based on the received data value, refers to the hash function value storage position correspondence table 635 (hash function value storage position correspondence table 317 in FIGS. 1 and 3), finds a move destination (DBMS executor 610c in FIG. 20) (step S2005), and issues an insert request to the move destination (step S2006).

The DBMS executor 610c when receiving the insert request inserts the data in the storage 620c through the operation of an insert 614c, and informs the DBMS acceptance section 600a of data insert position information and insert operation completion.

The DBMS acceptance section 600a receives the data insert position information and insert operation completion at the rebalance executor 1901 (step S2007), and adds move-destination data insert position information to the move source data (step S2008).

In the example of FIG. 20, the DBMS executor 610a searches for data ('trainer') 1911 having a product code value of 677, returns it to the DBMS acceptance section 600a. Since the data move destination is the storage 620c, the DBMS acceptance section 600a issues an insert request to the DBMS executor 610c and data 1921 is stored in the storage 620c. And after completion of the insert operation, the move-destination position information 1921 is added to the data 1911 of the move source of the DBMS executor 610a.

After the operation of the step S2008, the rebalance executor 1901 of the DBMS acceptance section 600a in FIG. 13 reads next search data and judges whether or not the next data is present (step S2009). In the presence of the next data, the rebalance executor repeats the data acceptance, move-destination specifying, data inserting and move-destination position information adding operations of the steps S2004 to S2008 until the operation of the data is fully completed.

When the next data becomes null move operation of all the data is completed in a step S2009, the DBMS acceptance section issues a delete request of the data added with the move-destination position information to the DBMS executor having so far stored therein the move data (step S2010).

The DBMS executor when receiving the delete request searches for and deletes the target data. After completion of the delete operation, the DBMS executor informs the DBMS acceptance section 600a of the delete completion. Thus the DBMS acceptance section 600a receives the delete completion of the data (step S2011), adds the additional area information 633 to the storage area information 632 (step S2012), deletes the additional area information 633 (step S2013), and erases the during-rebalance flag (step S2014).

When the rebalance operation is completed in this way, data 621 (stock table) so far stored in the storage 620a and data 622 (stock table) so far stored in the storage 620b in FIG. 20 are rebalanced as in the case of FIG. 12 so that the storage data 621a is placed in the storage 620a, the storage data 622a is placed in the storage 620b, and the storage data 623 is placed in the storage 620c.

Explanation will then be made in connection with a case where a search or update, delete and insert processing request is issued during such rebalance operation.

When a search processing request is issued during the rebalance operation, first of all, the DBMS acceptance section 600a in FIGS. 13 and 20 accepts a request at the request acceptor 601, analyzes the request at the analyzer 602, generates a processing procedure at the processing procedure generator 603 and determines an execution destination at the execution destination decider 604.

In the execution-destination determining operation, the areas defined in the storage area 632 of the table definition information 631 of the storage 630 in FIG. 20 are determined as the execution destinations as shown in FIG. 14 (step S1301).

In the example of FIG. 20, since the storages A and B are defined in the storage area 632, the DBMS acceptance section issues a search execution request to the DBMS executors 610a and 610b.

That is, the execution request/result receiver 605 issues the search execution request to the execution destinations determined by the execution destination decider 604, and receives their results. And the returner 606 returns the last received result received by the execution request/result receiver 605.

Next, when an update or delete processing request is issued during the rebalance operation, the DBMS acceptance section 600a accepts the request at the request acceptor 601, analyzes the request at the analyzer 602, generates a processing procedure at the processing procedure generator 603, and determines an execution destination at the execution destination decider 604.

In the execution destination determining operation, as shown in FIG. 15, the areas defined in the storage area 632 in the table definition information 631 of the storage 630 in FIG. 20 are defined as the execution destinations (step S1401).

In the example of FIG. 20, since the storages A and B are defined in the storage area 632, the DBMS acceptance section issued an update or delete execution request to the DBMS executors 610a and 610b.

The DBMS executors 610a and 610b search for (steps S1501 and S1601), updates or deletes (steps S1502 and S1602) data specified by the deletes 613a and 613b, as shown in FIGS. 16 and 17.

Further, DBMS acceptance section refers to the update or delete data, judges whether or not position information indicative of a copy destination is added to the update or delete data (steps S1503 and S1603). When the position information is added, the DBMS acceptance section updates or deletes data at the copy destination (steps S1506 and S1606).

Thereafter or in the steps S1503 and S1603, if the position information is not added, the DBMS acceptance section reads next data specified to be updated or deleted and judges whether or not the next data is present (steps S1504 and S1604).

In the presence of the next data, the DBMS acceptance section repeats the operations of the steps S1501 and S1601 and subsequent steps until all the data is searched for. In the absence of the next data, when the searching operation of all the data is completed, the DBMS executors 610a to 610b inform the DBMS acceptance section 600a of the execution completion (steps S1505 and S1605).

When the DBMS acceptance section 600a receives the execution completion notification from the DBMS executors 610a and 610b in this way, the DBMS acceptance section returns the last received result. That is, the execution request/result receiver 605 receives the results and the returner 606 returns the result last received at the execution request/result receiver 605.

When an insert request is issued, the DBMS acceptance section 600a in FIGS. 13 and 20 performs the respective operations of the request acceptor 601, analyzer 602 and processing procedure generator 603, and determines an insert destination at the execution destination decider 604. In this example, the insert destination determining operation is as shown in FIG. 18.

More specifically, the DBMS acceptance section first refers to the during-rebalance flag 634 and determines whether or not the rebalance operation is being executed (step S1701). Because the rebalance operation is being executed, the DBMS acceptance section finds a hash function value based on the data to be inserted (step S1701), refers to the hash function value storage position correspondence table 635 (hash function value storage position correspondence table 317 in FIGS. 1 and 3), determines an insert destination (1) (to be arbitrarily inserted) from the storage area 632 on the basis of the hash function value (step S1703), and determines an insert destination (2) (to be arbitrarily inserted) from the areas defined in the storage area 632 and the area defined in the additional area 633 (step S1704).

In the example of FIG. 20, when the hash function values are 0, 9, 4, 6 and 7, the storage 620a is selected as the insert destination (1); while, when the hash function values are 1, 8, 5, 2 and 3, the storage 620b is selected.

When the hash function values are 0, 9, 4 and 6, the storage 620a is selected. When the hash function values are 1, 8 and 5, the storage 620b is selected. When the hash function values are 2, 7 and 3, the storage 620c is selected.

The DBMS acceptance section 600a issues an insert execution request from the execution request/result receiver 605 to the insert destination thus selected, and receives their results.

The issuance of the execution request and acceptance of the results are as shown in FIG. 19.

More specifically, the execution request/result receiver 605 in FIG. 20 first refers to the during-rebalance flag 634 in the table definition information 631 of the storage 630 and judges whether or not the rebalance operation is being executed (step S1801).

Since the rebalance executor is now being executed, the DBMS acceptance section examines whether the storage as the insert destination (1) coincides with the storage as the insert destination (2) (step S1804). When finding a coincidence therebetween, the DBMS acceptance section issues an insert execution request to the determined insert destination (step S1805), and receives its result (step S1806).

When insert destination (1) is different from the insert destination (2) in the examination result of the step S1804, the DBMS acceptance section issues an insert execution request first to the insert destination (2) (step S1807) and, after completion of the insert operation at the associated DBMS executor, receives insert destination data storage position information therefrom (step S1808).

Next, the DBMS acceptance section adds the data storage position information received at the time of completion of insert operation to the insert destination (2) to the insert data, issues an insert execution request to the insert destination (1) (step S1809), and, after the associated DBMS executor completes the insert operation, receives its result (step S1810).

In the example of FIG. 20, when the hash function values are 0, 9, 4 and 6, the insert destination (1) is the same as the insert destination (2), that is, the same storage 620a. When the hash function values are 1, 8 and 5, the inserts (1) and (2) are the same as the insert storage 620b. Thus the DBMS acceptance section issues an insert request to the respective DBMS executors 610a and 610b and receives their insert results.

When the hash function value is 7, the insert destination (1) is the storage 620a and the insert destination (2) is the storage 620c. Thus the DBMS acceptance section issues an insert request first to the DBMS executor 610c corresponding to the storage 620c, receives insert position information data, and issues an insert request of data added with the insert position data received by the DBMS executor 610c to the DBMS executor 610a corresponding to the storage 620a.

Similarly, the hash function values are 2 and 3, the insert destination (1) is the storage 620b and the insert destination (2) is the storage 620c. Thus the DBMS acceptance section first issues an insert request to the DBMS executor 610c associated with the storage 620c, receives insert position information data, and the issues an insert request of data added with the insert position data received at the DBMS executor 610c to the DBMS executor 610b associated with the storage 620b.

During such search, update, delete or insert operation, since data being processed is locked, another user or rebalance operation is prohibited from performing the search, update, delete or insert operation unless otherwise specifically stated by the user. Similarly, since even data to be moved for each data case during the rebalance operation is also locked, another user is prohibited from performing the search, update, delete or insert operation until the move operation is completed.

The execution destination of the search, update, delete or insert operation has been determined for all the storages having the date stored therein in this example. However, in the case of the search, update, delete or insert operation having a condition added thereto, the limited execution destination can be executed.

The rebalance operation and the search, update, delete or insert operation during the rebalance operation in the aforementioned second embodiment will be summarized as follows with reference to FIG. 22.

Figure 22A:
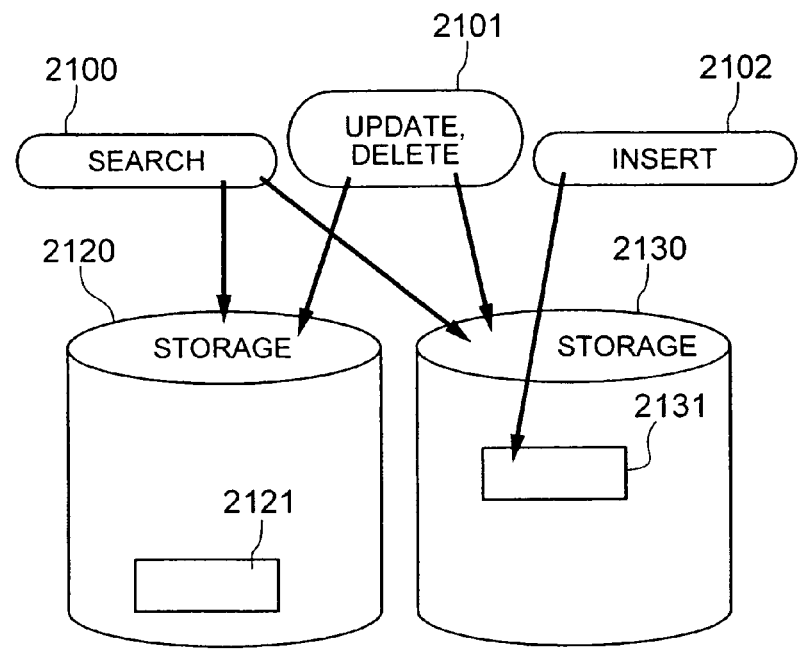
FIGS. 22A and 22B are diagrams for explaining a second example of accepting and executing a database processing request in the rebalance operation of the database system of FIG. 1.

First in FIG. 22A, it is assumed that hash function values of 0, 4, 6, 7 and 9 are stored in a storage 2120 and hash function values of 1, 2, 3, 5 and 8 are stored in a storage 2130 respectively as divided.

When there are database tables thus divided, a search operation 2100 is executed by the storages 2120 and 2130, an update/delete operation 2100 is executed by the storages 2120 and 2130, and such insert operation of data 2131 as to provide a hash function values of 3 is executed by the storage 2130.

Figure 22B:
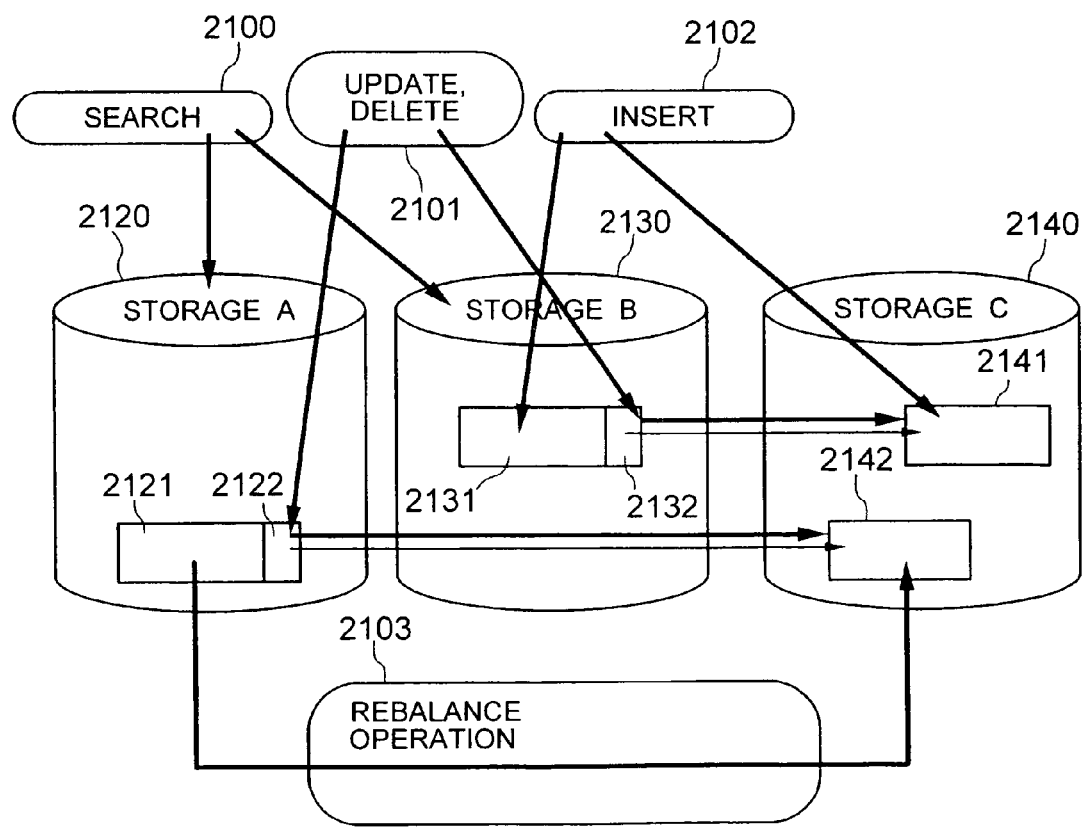

When a storage 2140 is added as shown in FIG. 22B (a combination of the storage 2120 and 2130 being called an existing are and the storage 2140 being called an additional area), a rebalance operation 2103 selects data 2121 to be moved to the storage 2140 from the data stored in the storages 2120 and 2130, copies the selected data 2121 to the storage 2140, and adds storage position information 2122 of data 2142 copied to the copy source data 2121.

The copy of the data 2121 is carried out by the search operation of the move data of the storages 2120 and 2130 and by the insert operation to the data 2142. During a time from the copy of the move target data 2121 to the add of the storage position information to the data 2121, the data 2121 is locked so that another user is prohibited from performing the search, update, or delete operation.

The search operation 2100 during such rebalance operation is executed in the existing areas. That is, the search operation is executed in the storages 2120 and 2130. Further update/delete operation 2101 during the rebalance operation is also executed in the existing area. When the copy destination position information is added to the data to be updated/deleted, however, the update/delete operation is executed even over data indicated by the copy destination position information.

That is, when the update/delete operation is executed in the storage 2120 and 2130 to update/delete the data 2121 and 2131 added with the copy destination position information 2122 and 2132, the update/delete operation is executed even over the data 2141 and 2142 of the storage 2140 indicated by the copy destination position information 2122 and 2132.

In this connection, the data being searched/updated/deleted is locked so that the rebalance operation is prohibited from referring to the data unless otherwise specifically stated by another user.

Next, in the insert operation 2102 of such data 2131 as to provide a hash function value of 3 during the rebalance operation, the data 2141 is stored in the storage 2140 and the data 2131 added with the data position information 2132 is stored in the storage 2130.

When another user tries to perform search/update/delete operation over the data being moved during the rebalance operation, he has to wait until the move operation of the data is completed because the data is locked to prohibit access thereto. However once the lock is release due to the move completion of the data, his operation so far awaited can be resumed.

Further, even when the rebalance operation tries to move the data being searched/updated/deleted, the lock of the data causes prohibition of access to the data. Thus the move operation has to be awaited until the user release the lock. Once the lock is released, the rebalance operation so far awaited can be resumed. Thus it can be prevented that the value of the data be unduly updated or the data be deleted.

Further, since the data moved through the rebalance operation remains in the existing areas even during the rebalance operation, only execution in the existing areas enables search operation of all the data.

In this manner, in the database system of the second embodiment, the data moved by the rebalance operation is added. Therefore, when the update/delete operation is executed over the data indicated by the position information at the time of updating/deleting the data added with the position information, the update/delete operation can be realized even over the data moved by the rebalance operation.

Further, when data to be rebalanced is stored in the same format as data being rebalanced, generation of excessive rebalance operation can be prevented.

As a result, the system can accept search, update, delete and insert processing requests to the table being rebalanced during the rebalance operation and can execute them concurrently.

In the database management system of the arrangement allowing realization of both of the aforementioned first and second embodiments, when the function operation of either one of the first and second embodiments is selected on the basis of the presence or absence of a column type or index included in the table, the rebalance operation and the search, update, delete and insert operations optimum for the attribute of the table can be executed.

Similarly, it is also possible to reduce the number of storages for data storage.

Figure 23:
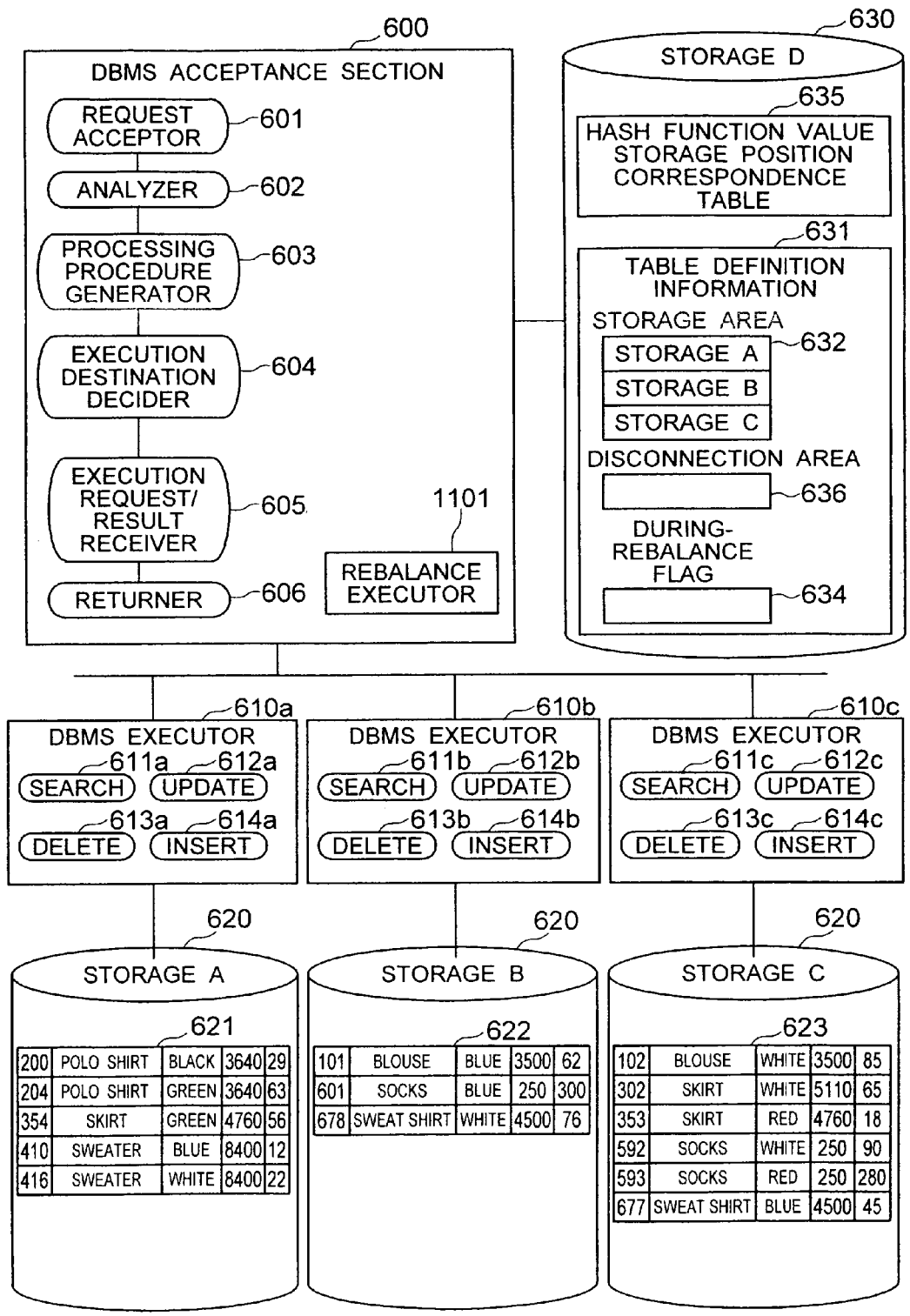
FIGS. 23 to 25 are diagrams for explaining the data processing of the rebalance operation necessary when the number of storages are reduced in accordance with the invention.
Figure 24:
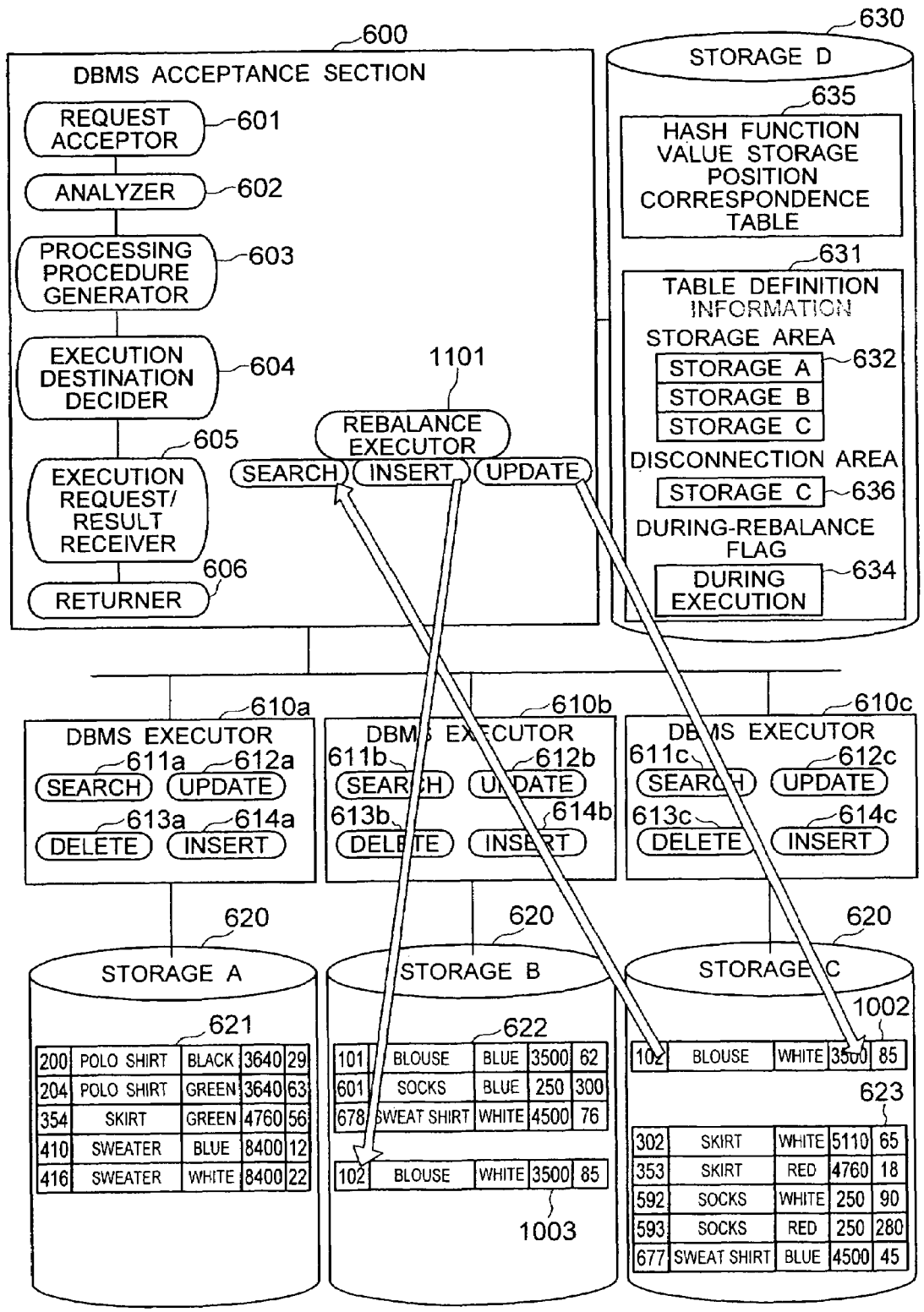

In the database management system of FIG. 23, such storage areas of a stock table as shown in FIG. 24 and the storage 620c is disconnected. Thus when the storage C is defined in a disconnection area information 636 of the storage 630 and a rebalance processing request is generated, the operation of a rebalance operation executor 1101 is started.

The details of the rebalance operation of the rebalance operation executor 1101 are nearly the same as when the aforementioned explanation based on FIG. 11, but data to be moved corresponds to all the data stored in the disconnection area. Further, the number of area divisions is reduced from three to two so that, on the basis of the hash function value storage position correspondence table 635, data indicative of hash function values of 2, 7 and 3 stored in the storage 620c and having a hash function value of 7 is moved to the storage 620a, and data indicative of hash function values of 2 and 3 is moved to the storage 620b.

Figure 25:
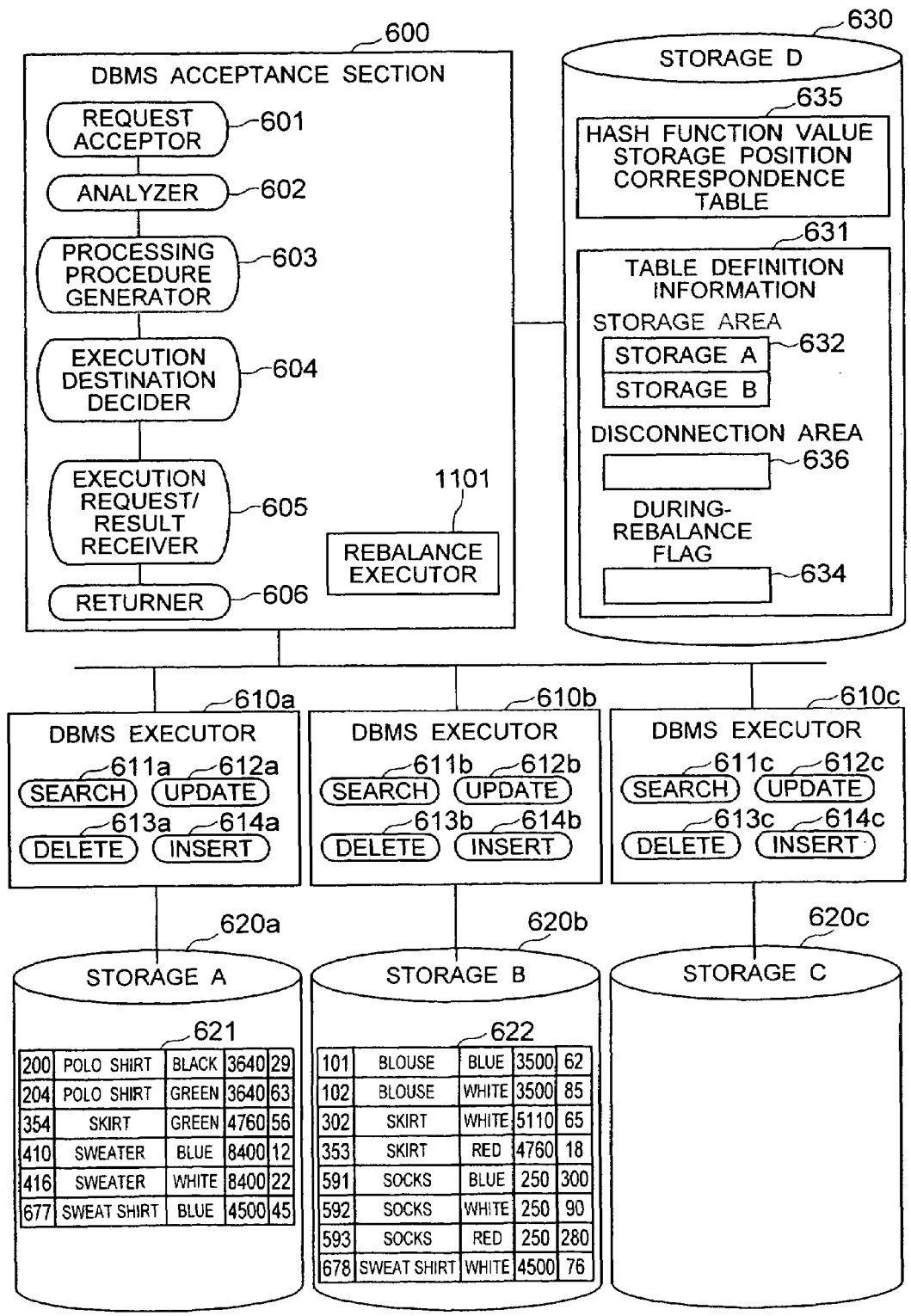

When the rebalance operation is completed, the data are stored in the storages 620a and 620b as shown in FIG. 25.

The operation when data search, update or delete request is issued during the rebalance operation is nearly the same as the aforementioned description. The operation when an insert request is issued during the rebalance operation is nearly the same as the aforementioned description, except for the operation of the insert destination decider.

The operation of the insert destination decider find a hash function based on data to be inserted, refers to the hash function value storage position correspondence table 635, and selects an insert destination from one of the areas defined in the storage area information 632 by the hash function other than the area defined in the disconnection area information 636.

As has been explained in connection with FIGS. 1 to 25, the database system and database management method in this example performs its data management operation according to a procedure which follows.

(a) In the database system for allocating the data of the table having a plurality of data items to a plurality of storages and storing the table data in storages determined by a specified division rule (method) such as, e.g., hash function, when a storage is required to be added for storage of the table data, the system determines data to be moved to the additional storage according to the hash function with use of information on the existing and additional storages, performs the data rebalance operation to move all the determined data to the additional storage. Further, when a search, update or delete request to the table data is issued during the data rebalance operation, the system executes the search, update or delete operation over the existing and additional storages for storage of the data in question. When an insert request to the table data is issued, the system determines one of the existing and additional storages for the data to be inserted according to the division rule using the hash function and inserts the data in question in the determined storage.

(b) In the parallel database system for performing parallel operation over the respective storages when a search, update or delete request to the table data is issued, in particular, when a storage is required to be added for storage of the table data, the system determines data to be moved from the existing storages to the additional storage according to the division rule using the hash function or the like with use of information on the existing and additional storage, and performs rebalance operation over all the determined data to be moved to the additional storage. When search, update and delete requests to the table data are issued during the data rebalance operation, the system performs parallel operation of search, update and delete in the existing and additional storages. When the operation of the existing storage is fully completed, the system performs parallel operations of search, update and delete over the additional storage. Further, when an insert request to the table data is issued, the system inserts the data in the storage determined according to the data division rule using the hash function including information about the existing and additional storages.

(c) When a storage is required to be added for storage of the table data, the system first copies data to be determined as moved according to the division rule using the hash function or the like from the existing storage to the additional storage, and adds position information of the copied data on the additional storage to the data of the storage as the copy source. And when completing the copying operation of all the data to be moved in this way, the system executes the data rebalance operation to delete all the data of the copy source. Further, when a search request to the table data is issued during the execution of the data rebalance operation, the system performs search operation over the data stored in the existing storages. When an update or delete request is issued, the system performs update or delete operation over the data stored in the existing storages. When the data as the update or delete object is added with position information indicative of a copy destination to the additional storage, the system performs the same update or delete operation over the data of the copy destination. Further, when an insert request to the table data is issued, the system stores the data in the storage determined according to the division rule specified only for the existing storages. Further, in a division method which is applied to the storages including the additional storage, when the data is to be moved to the additional storage, the system stores the data even in the additional storage and adds storage position information thereof to the additional storage to the data stored in the existing storages.

Any one of the above techniques (a) to (c) is selected and executed depending on a table to be processed.

In this way, the database system and database management method in this example, at the time of performing rebalance operation over the data stored in the existing storages due to addition of a storage to be rebalanced in table data of a relational database management system of storing as divided into a plurality of storages, can execute database services such as search, update, delete and insert concurrently.

The present invention is not limited to the embodiments explained with reference to FIGS. 1 to 25 but may be modified in various ways so long as it does not depart from its gist or subject matter. For example, although the database system and database management system have used three storages in the present embodiment, the number of such storages may be two or four or more. Even with regard to the data division rule (method) to the respective storages, the present invention is not limited only to the use of the hash function as in the present embodiment, but a key range division method or a round robin division method may be employed.

In the present embodiment, the DBMS 300 has been configured with computers as shown in FIG. 2 as its hardware configuration. However, like the user terminals 330a to 330c, the DBMS may be configured with computers provided with input devices such as keyboards and display devices such as CRT (cathode ray tube). Though explanation has been made in connection with the case where an optical disk is used as the recording medium in the present embodiment, a flexible disk (FD) may be used as the recording medium. Even with respect to program installation, the program can be downloaded from a communication device via a network and then installed.

What is claimed is:

1. A database management system comprising:
a processor;
an acceptance section;
a plurality of database management executors, connected to a plurality of existing storages,
wherein, in a first operation, each of the plurality of existing storages stores a table of data having a plurality of data items, and
wherein said table of data is determined according to a predetermined division rule and stored in the existing storages;
rebalance operation means for executing a second operation by determining data to be moved between the existing storages due to any one of addition and disconnection of an additional storage to be connected, according to said division rule, and by moving the data that was determined to be moved;
means for accepting any one of a search request, update request, delete request or insert request to said table of data at said acceptance section of said database management system during execution of the second operation by the rebalance operation means;
means, in response to any one of said search request, update request and delete request that has been accepted, for parallelly executing search, update and delete operations over the existing storages connected to said database management system executors, and after completion of parallelly executing said search, update and delete operations over said existing storages, parallelly executing said search, update and delete operations over said additional storage added to said existing storages of said database management system executors; and
means, in response to the insert request that was accepted, for determining a storage destination of data to be inserted in said additional storage, according to said division rule, and for inserting the data to be inserted in the storage destination that was determined.

2. The database management system according to claim 1, further comprising:
means, in response to the insert request that was accepted, for determining a storage destination of data to be inserted in said additional storage, according to said division rule, and for inserting the data to be inserted in the storage destination that was determined.

3. A database management method for a database system connected to a plurality of existing storages, wherein in a first operation, each of the plurality of existing storages stores a table of data having a plurality of data items, and wherein said table data is determined according to a predetermined division rule and stored in the existing storages, said method comprising the steps of:
executing a second operation by determining data to be moved between the existing storages, according to said division rule, due to any one of addition and disconnection of an additional storage to be connected, and by moving the data that was determined to be moved;
accepting any one of a search request, an update request, a delete request and an insert request to said table of data during execution of said second operation in said step of executing said second operation;
in response to any one of said search request, update request and delete request that has been accepted, executing a search operation in response to said search request, an update operation in response to said update request, or a delete operation in response to said delete request, for said existing storages;
in response to the request that was accepted, determining a storage destination of data to be searched, updated, deleted, or inserted in said existing storages, according to said division rule; and
in response to any one of said search request, update request and delete request that has been accepted, parallelly executing search, update and delete operations over said existing storages, and after completion of parallelly executing said search, update and delete operations over said existing storages, parallelly executing the search, update and delete operations over said additional storage added to said existing storages.

4. The database management method according to claim 3, further comprising: in response to the insert request that was accepted, determining a storage destination of the data to be inserted in said existing storage and said additional storage, according to said division rule, and inserting said data to be inserted in the storage destination that was determined.

* * * * *